US011177886B2

(12) United States Patent
Williams et al.

(10) Patent No.: US 11,177,886 B2
(45) Date of Patent: Nov. 16, 2021

(54) PLUGGABLE OPTICAL AMPLIFIER FOR DATACENTER INTERCONNECTS

(71) Applicant: II-VI Delaware, Inc., Wilmington, DE (US)

(72) Inventors: Martin Williams, Big Flats, NY (US); Yajun Wang, Naperville, IL (US); Eric Green, Corning, NY (US); Aravanan Gurusami, Morgan Hill, CA (US); Deepak Devicharan, Horseheads, NY (US); Timothy Zahnley, Cameron, NY (US); Mike Burgess, Elmira, NY (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 16/812,186

(22) Filed: Mar. 6, 2020

(65) Prior Publication Data
US 2021/0281323 A1     Sep. 9, 2021

Related U.S. Application Data

(63) Continuation-in-part of application No. 16/672,316, filed on Nov. 1, 2019.

(51) Int. Cl.
*H04B 10/00* (2013.01)
*H04B 10/297* (2013.01)
*H01S 3/067* (2006.01)

(52) U.S. Cl.
CPC ..... *H04B 10/2972* (2013.01); *H01S 3/06787* (2013.01); *H04B 10/2971* (2013.01)

(58) Field of Classification Search
CPC ............ H04B 10/2972; H04B 10/2971; H01S 3/06787
See application file for complete search history.

(56) References Cited

U.S. PATENT DOCUMENTS 6,486,984 B1 * 11/2002 Baney .................... H04B 10/00
                                                                372/20
6,738,584 B1 *  5/2004 Tsuda .................... H04B 10/11
                                                               385/123

(Continued)

FOREIGN PATENT DOCUMENTS

WO     WO-2007132268 A2 * 11/2007    ........... H04B 10/296

OTHER PUBLICATIONS

Licomm, "QSFP-EDFA Pluggable EDFA Series", Jun. 23, 2019, All Pages (Year: 2019).*

*Primary Examiner* — David C Payne
*Assistant Examiner* — Pranesh K Barua
(74) *Attorney, Agent, or Firm* — Blank Rome LLP

(57) ABSTRACT

A pluggable bidirectional optical amplifier module may include preamp and booster optical amplifiers and a housing. The preamp optical amplifier may be configured to amplify optical signals traveling in a first direction. The booster optical amplifier may be configured to amplify optical signals traveling in a second direction. The housing may at least partially enclose the preamp optical amplifier and the booster optical amplifier. The pluggable bidirectional optical amplifier module may have a mechanical form factor that is compliant with a pluggable communication module form factor MSA. A colorless mux/demux cable assembly may be operated with the pluggable bidirectional optical amplifier. The colorless mux/demux cable assembly may include a 1:N optical splitter a N:1 optical combiner coupled side-by-side to the 1:N optical splitter, a first fiber optic cable optic cable, and a second fiber optic cable.

19 Claims, 11 Drawing Sheets

(56) References Cited

U.S. PATENT DOCUMENTS

| | | | |
|---|---|---|---|
| 9,780,881 B1* | 10/2017 | Rope | H04B 10/40 |
| 9,793,667 B1* | 10/2017 | Park | H04Q 1/02 |
| 2003/0223747 A1* | 12/2003 | Olier | H04B 10/07955 |
| | | | 398/43 |
| 2004/0208569 A1* | 10/2004 | Nabeyama | H04B 10/07 |
| | | | 398/79 |
| 2007/0297044 A1* | 12/2007 | Qiao | H01S 3/13013 |
| | | | 359/337 |
| 2009/0175626 A1* | 7/2009 | Yang | H04B 10/2971 |
| | | | 398/135 |
| 2009/0317078 A1* | 12/2009 | Uda | H04B 10/0775 |
| | | | 398/29 |
| 2014/0056593 A1* | 2/2014 | DeAndrea | H04B 10/40 |
| | | | 398/135 |
| 2014/0376918 A1* | 12/2014 | Boduch | H04L 25/03006 |
| | | | 398/83 |
| 2015/0200851 A1* | 7/2015 | Berman | H04L 49/357 |
| | | | 398/45 |
| 2017/0343740 A1* | 11/2017 | Nguyen | G02B 6/3833 |
| 2018/0188465 A1* | 7/2018 | Zer | G02B 6/4441 |
| 2019/0182985 A1* | 6/2019 | Gaviola | H05K 7/20336 |
| 2019/0190604 A1* | 6/2019 | Kilper | H04J 14/0241 |

* cited by examiner

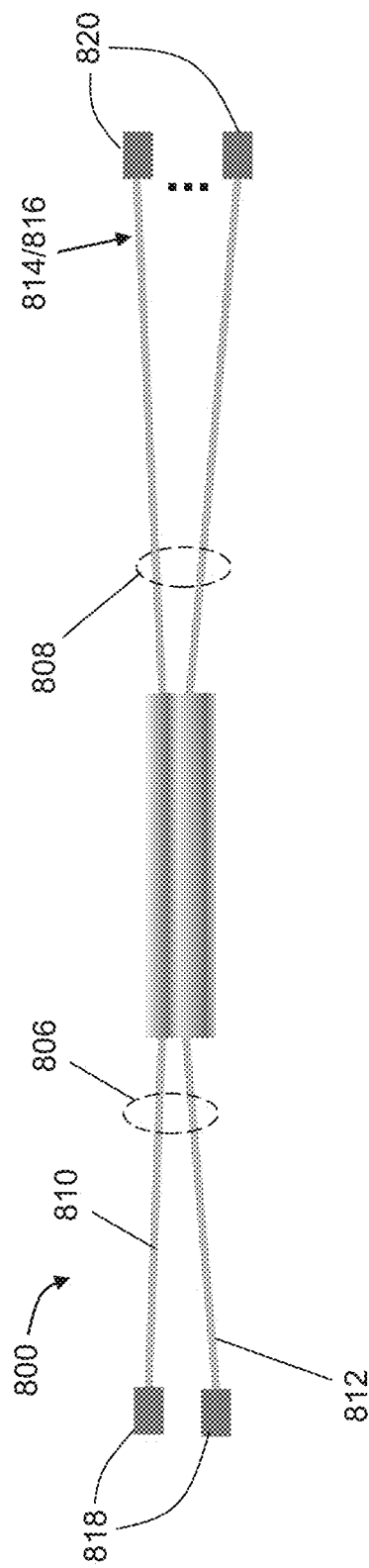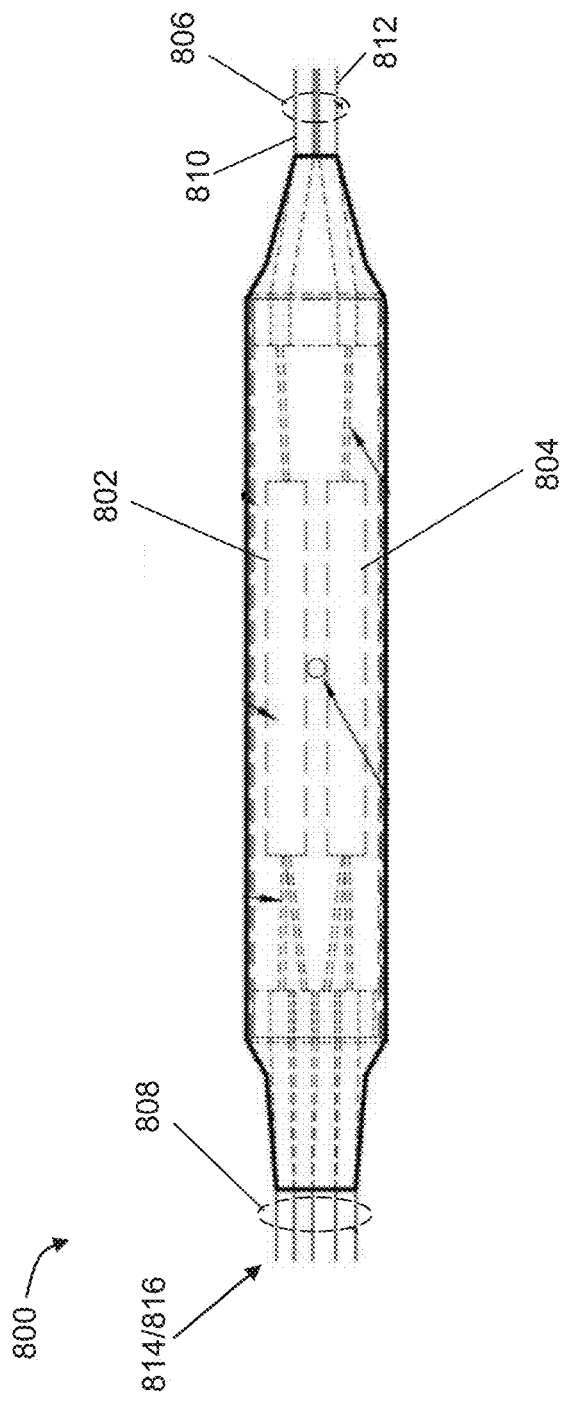
FIG. 8A
FIG. 8B

PLUGGABLE OPTICAL AMPLIFIER FOR DATACENTER INTERCONNECTS

CROSS-REFERENCE TO RELATED APPLICATIONS

This patent application is related to U.S. application Ser. No. 16/672,316 filed Nov. 1, 2019. The Ser. No. 16/672,316 application is incorporated herein by reference.

FIELD

The embodiments discussed herein relate to a pluggable amplifier for datacenter interconnects.

BACKGROUND

Unless otherwise indicated in the present disclosure, the materials described in the present disclosure are not prior art to the claims in the present application and are not admitted to be prior art by inclusion in this section.

Some datacenters include routers, switches, or other transmission chassis configured to receive multiple communication modules that convert data between the optical and electrical domains, optical signals generally being used for transmission between switches and routers and electrical signals generally being used internally on the switches and routers. Optical loss between two interconnected routers and switches may be significant enough that optical amplifiers may be deployed before or after fiber spans to compensate the optical loss.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example, a pluggable bidirectional optical amplifier module may include preamp and booster optical amplifiers and a housing. The preamp optical amplifier may be configured to amplify optical signals traveling in a first direction. The booster optical amplifier may be configured to amplify optical signals traveling in a second direction. The housing may at least partially enclose the preamp optical amplifier and the booster optical amplifier. The pluggable bidirectional optical amplifier module may have a mechanical form factor that is compliant with a pluggable communication module form factor multisource agreement (MSA).

In another example, a colorless multiplexer/demultiplexer (mux/demux) cable assembly may include a 1:N optical splitter, an N:1 optical combiner coupled side-by-side to the 1:N optical splitter, and first and second fiber optic cables. The first fiber optic cable may include an input fiber and an output fiber. The input fiber may be optically coupled to an input of the 1:N optical splitter and the output fiber may be optically coupled to an output of the N:1 optical combiner. The second fiber optical cable may include N output fibers and N input fibers. Each of the N output fibers may be optically coupled to an output of the 1:N optical splitter and each of the N input fibers may be optically coupled to an input of the N:1 optical combiner.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 8A and 8B illustrate an example colorless multiplexer/demultiplexer cable assembly;

DETAILED DESCRIPTION

Figure 1:
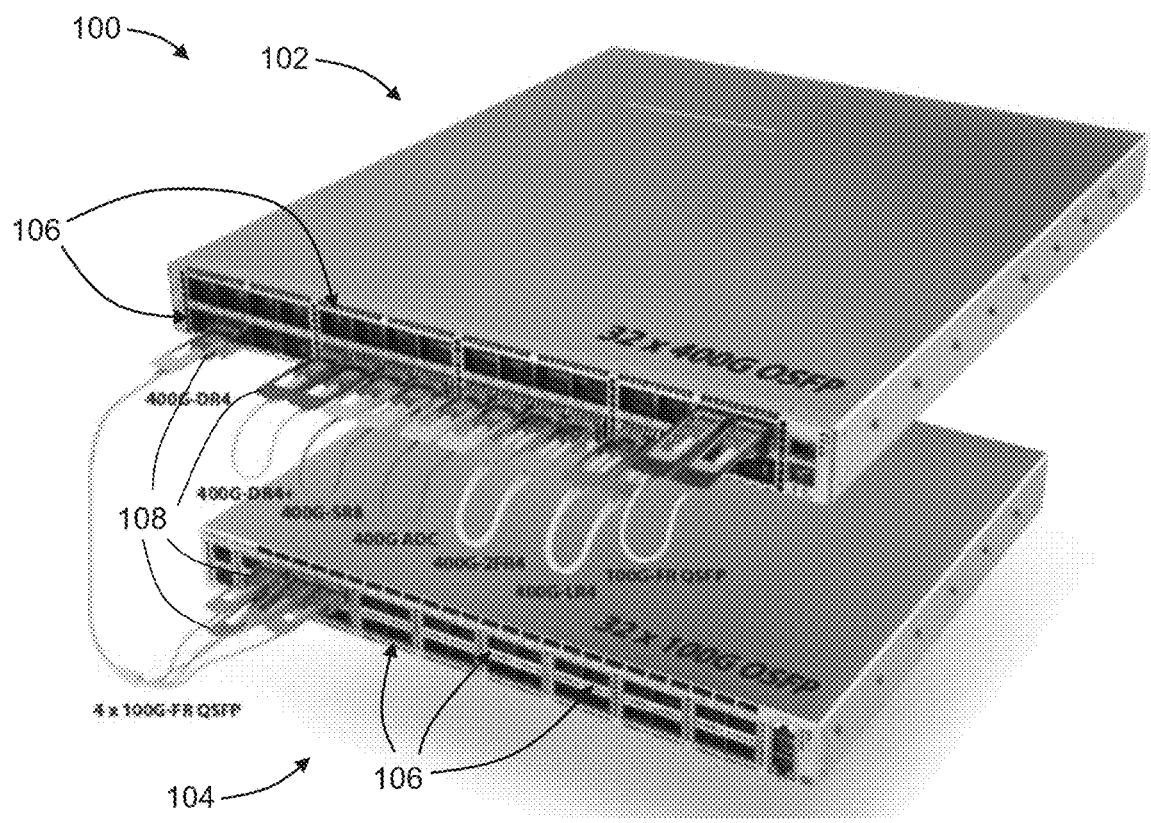
FIG. 1 illustrates an example operating environment in which some embodiments described herein may be implemented.

Embodiments described herein include a pluggable bidirectional optical amplifier module (hereinafter "pluggable amplifier") for efficient datacenter interconnection. The pluggable amplifier may be optically bidirectional, e.g., it may provide optical amplification in each of two opposing transmission directions. The pluggable amplifier may have attributes such as a mechanical form factor to plug in directly into coherent transceiver cages/slots on routers, switches, or other transmission chassis used in a datacenter.

Some embodiments may alternatively or additionally include a colorless multiplexer (mux)/demultiplexer (demux) cable assembly (hereinafter "mux/demux cable"). The pluggable amplifier or the mux/demux cable may provide dense wavelength division multiplexing (DWDM) transport with multiplexing and demultiplexing of optical channels from transceiver modules in the routers or switches or other transmission chassis with a physical polarization.

The pluggable amplifier may include a preamp optical amplifier and a booster optical amplifier, each of which may include an erbium-doped fiber amplifier (EDFA). Each of the preamp and booster optical amplifiers may use an operational wavelength range in an optical spectrum of the EDFA that has a relatively flat gain spectrum. As such, expensive and space inefficient gain flattening filter (GFFs) may be omitted from the pluggable amplifier.

Some embodiments may apply very low depth pump modulation to implement a virtual supervisory channel (VSC) amplifier node-to-amplifier node two-way communication. Plug-and-play operation may be realized and the optical amplifiers at both ends of a fiber span may automatically self-provision for various link budgets through the VSC. By using the VSC instead of an optical supervisory channel (OSC) and its associated additional hardware, some embodiments may improve system optical signal-to-noise ratio (OSNR) since OSNR margin may be tighter for high baud/high modulation transmission. More generally, the VSC may be used to exchange network information between amplifier nodes. The network information may include supervisory information, e.g., information typically exchanged via OSC or other non-payload/non-customer data. For example, the network information may alternatively or additionally include a software update to be installed at the amplifier node. Thus, the network information exchanged between nodes via the VSC is not limited to supervisory information.

In some embodiments, the pluggable amplifier may have a host interface that supports or is adapted from a Common Management Interface Specific (CMIS) Rev 2.0 (or other revisions). The host interface may implement register mapping on a serial interface common to transceiver shelves for digital diagnostics and management purposes.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

FIG. 1 illustrates an example operating environment 100 in which some embodiments described herein may be implemented. The environment 100 includes a datacenter switch fabric made up of one or one or more interconnected switches or routers. FIG. 1 specifically illustrates two switches 102, 104 optically interconnected to each other where the switch 102 has various intra-switch optical connections as well.

Each of the switches 102, 104 includes multiple cages or slots 106 to receive multiple pluggable communication modules (hereinafter "communication modules"), such as an optoelectronic transceiver or transponder module. In particular, each cage or slot 106 is configured to receive any of the communications modules 108. Only some of the cages or slots 106 and some of the communications modules 108 are labeled in FIG. 1 for simplicity.

Each of the switches 102, 104 specifically includes 32 cages or slots 106 as illustrated, although there may be more or fewer cages or slots 106 in other embodiments. Each cage or slot 106 is configured to receive an OSFP-compliant communication module 108 in the example of FIG. 1. An OSFP-compliant communication module is a communication module that is compliant with the OSFP multisource agreement (MSA). In other embodiments, the communication modules 108 may be compliant with other communication module MSAs, such as the QSFP56-DD MSA, the CFP8 MSA, or other MSA. All of the cages or slots 106 may have the same form factor, e.g., may conform to the same MSA. The cages or slots 106 and the communication modules 108 generally conform to the same MSA.

In some embodiments, a pluggable bidirectional optical amplifier module (hereinafter "pluggable amplifier") may have a same form factor as the communication modules 108 and the cages or slots 106. Accordingly, pluggable amplifiers as described herein may be plugged into any of the cages or slots 106 of the switches 102, 104. In comparison to such pluggable amplifiers as described herein, other optical amplifiers often used in datacenters are typically implemented in a dedicated chassis with amplifier line cards plugged in, or in a dedicated and relatively large box form factor.

Such pluggable amplifiers may be configured to optically amplify optical signals transmitted from one switch or router to another switch or router before or after a span of optical fiber that interconnects the two switches/routers to compensate for insertion loss. An optical amplifier placed upstream of the span may be referred to as a booster optical amplifier, while an optical amplifier placed downstream of the span may be referred to as a preamp optical amplifier.

In comparison to such pluggable amplifiers, the communication modules 108 are generally configured to convert outbound electrical signals from a host, such as the switches 102, to outbound optical signals, and to convert inbound optical signals to inbound electrical signals for the host.

Figure 2:
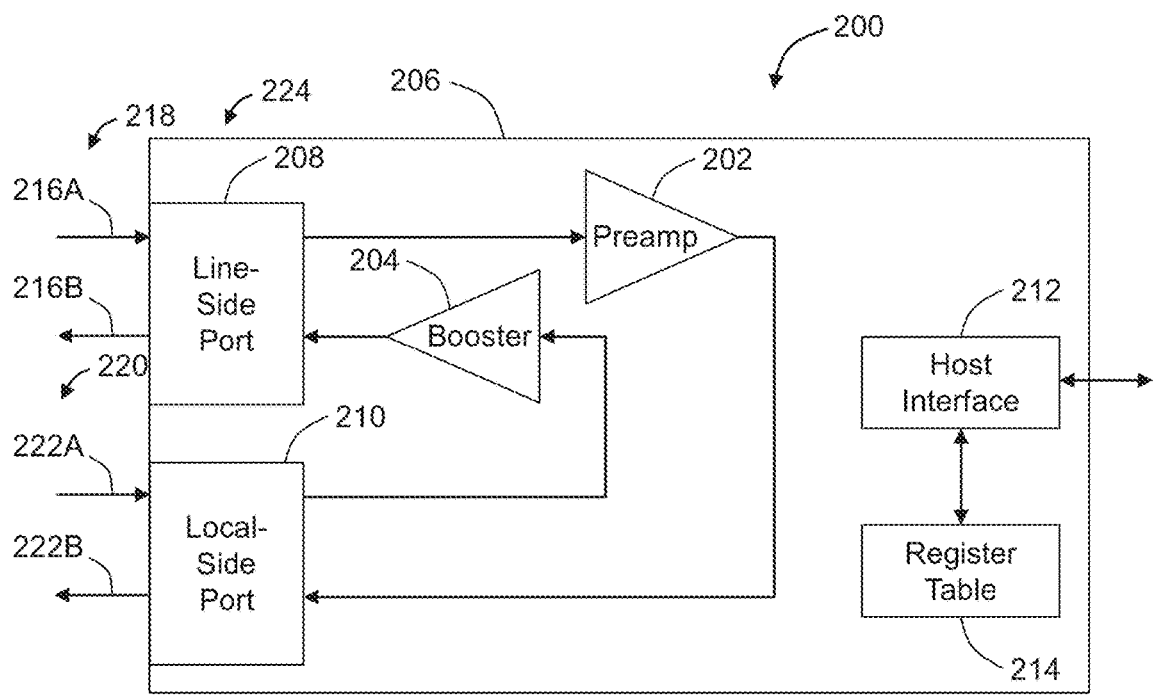
FIG. 2 is a block diagram of an example pluggable bidirectional optical amplifier module that may be implemented in the operating environment of FIG. 1.

FIG. 2 is a block diagram of an example pluggable bidirectional optical amplifier module 200 (hereinafter "pluggable amplifier 200") that may be implemented in the operating environment 100 of FIG. 1, arranged in accordance with at least one embodiment described herein. The pluggable amplifier 200 may generally include a preamp optical amplifier 202 (hereinafter "preamp 202"), a booster optical amplifier 204 (hereinafter "booster 204"), and a housing 206. The pluggable amplifier 200 may additionally include a line-side port 208, a local-side port 210, a host interface 212, and a register table 214.

The preamp 202 is configured to amplify optical signals traveling in a first direction through the pluggable amplifier 206. In particular, inbound line-side optical signals 216A from a line side 218 may be optically amplified by the preamp 202 and output to a local side 220 as outbound local-side optical signals 222B.

The booster 204 is configured to amplify optical signals traveling in a second direction through the pluggable amplifier 206. The second direction may be opposite to the first direction. In particular, inbound local-side optical signals 222A from the local side 220 may be optically amplified by the booster 204 and output to the line side 218 as outbound line-side optical signals 216B.

The inbound and outbound local-side optical signals 222A, 222B (collectively "local-side optical signals 222) may be exchanged between the pluggable amplifier 206 and one or more local communication modules, e.g., communication modules that are installed in the same switch, router, or other datacenter transmission chassis as the pluggable amplifier 206. In comparison, the inbound and outbound line-side optical signals 216A, 216B (collectively "line-side optical signals 216") may be exchanged between the pluggable amplifier 206 and one or more remote pluggable amplifiers or communication modules, e.g., pluggable amplifiers or communication modules that are installed in a different switch, router, or other datacenter transmission chassis as the pluggable amplifier 206.

The housing 206 is configured to at least partially enclose the preamp 202 and the booster 204. The housing 206, and more generally the pluggable amplifier 200, may have a mechanical form factor that is compliant with a pluggable communication module MSA such as the OSFP MSA or other suitable MSA.

Each of the line-side port 208 and the local-side port 210 may be formed in or by the housing 206 and may be configured to receive a fiber optic connector to optically couple the pluggable amplifier 206 to one or more optical fibers terminated by the fiber optic connector. The line-side port 208 may include a duplex line-side port or two discrete line-side ports. Similarly, the local-side port 210 may include a duplex line-side port or two discrete local-side ports.

The line-side port 208 and the local-side port 210 may be configured to receive fiber optic connectors with the same or different form factors. In an example, the line-side port 208 may include a duplex port configured to receive a duplex LC connector while the local-side port 210 may include a duplex port configured to receive a duplex CS connector.

Although not illustrated in FIG. 2, the pluggable amplifier 200 may include a printed circuit board (PCB) at least partially enclosed within the housing 206 with one or more integrated circuits (ICs) or other components mounted thereon. For example, the preamp 202, the booster 204, one or more components thereof (such as a pump driver, modulator, demodulator, or other components), a controller, the register table 214, the host interface, or other components may be mounted to or at least partially included on or in the PCB. The PCB may also include an edge connector to communicatively couple the pluggable amplifier 200 to a host device, such as the switch 102, 104 of FIG. 1.

The host interface 212 may provide a communication interface between the pluggable amplifier 200 and the host device for digital diagnostics and management purposes. The PCB edge connector may be included in the host interface 212. The host interface 212 may include a serial interface common to that used between communication modules (such as the communication modules 108 of FIG. 1) and host devices (such as the switches 102, 104 of FIG. 1). For example, the host interface 212 may include a serial interface commonly used to communicate network and control data, as opposed to customer or payload data, between host devices and communication modules, such as inter-integrated circuit ($I^2C$), management data input/output (MDIO), 1-wire, or other suitable serial interface.

The host interface 212 may be based on or may implement a Common Management Interface Specification (CMIS) Rev 4.0, other version of CMIS, other management interface, or modification(s) thereof. Accordingly, the host interface 212 may support some or all of the functionality of CMIS Rev 4.0 or other management interface. In some embodiments, the management interface upon which the host interface 212 is based may be modified to include a register table, e.g., the register table 214, for ease of deployment. The register table 214 may be directly accessible from the host device through the host interface 212.

The host interface 212 may include a paged module interface, which may be familiar to datacenter administrators already familiar with communication module management. The pluggable amplifier 200 may present through the host interface 212 as a two-lane transceiver or other communication module where one lane represents the line side 218 and the other lane represents the local side 220. The host interface 212 may include a single Module State Machine and a single Data Path State Machine.

The host interface 212 may be as compliant as can be realized given the underlying pluggable amplifier 200 is a dual EDFA as opposed to a communication module such as a transceiver. The pluggable amplifier 200 may advertise one "application" with no pertinent control set parameters through the host interface 212. On boot, the pluggable amplifier 200 may automatically activate this application.

The host interface 212 may support one or more pages of CMIS Rev 4.0. For example, the page(s) supported by the host interface 212 may include one or more of Lower Page (Control and Status Essentials), Upper Page 00h (Administrative Information), Upper Page 01h (Advertising), Upper Page 02h (Module and Lane Thresholds), Upper Page 10h (Lane and Data Path Control), Upper Page 11 h (Lane Status), and Upper Page 9Fh (CDB Messaging). "Banking" may be supported by the host interface 212. Upper pages 10h and 11h may implement one bank in the host interface 212, consistent with two lanes. Upper page 9Fh may implement two banks in the host interface 212, consistent with two independent Command Data Block engines.

The host device may detect the presence of the pluggable amplifier 200 using the same methods as it does communication modules. The host device may retrieve monitor values and sense alarms as it does for communication modules. The host device need not issue commands to start up the pluggable amplifier 200. Instead, it may simply raise the ResetL digital input and the LPMode digital input. Raising the ResetL digital input may allow the pluggable amplifier 200 to come out of reset. Raising the LPMode digital input may allow the pluggable amplifier 200 to transition to full power.

The host interface 212 may include some custom interface aspects, implemented in a compliant way. For example, the CMIS Rev 4.0 specification assumes that all lanes are symmetric and only provides for a single set of alarm thresholds for optical receive (RX) and transmit (TX) powers. Some embodiments of the host interface 212 described herein include a second set of "alternate" thresholds because the two lanes, e.g., EDFAs included in each of the booster 204 and the preamp may not be symmetric.

Figure 3A:
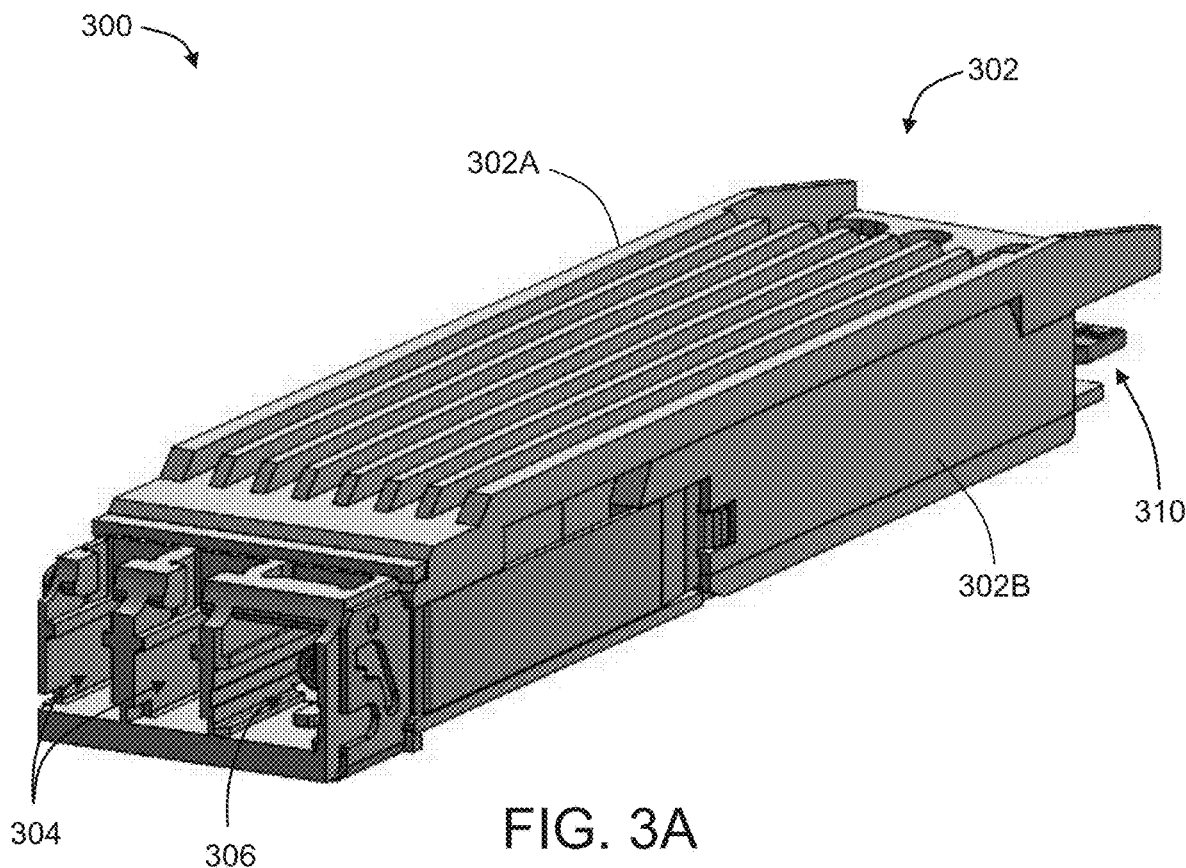
FIGS. 3A-3C include two perspective views and an end view of an example pluggable bidirectional optical amplifier module that may be implemented in the operating environment of FIG. 1.
Figure 3B:
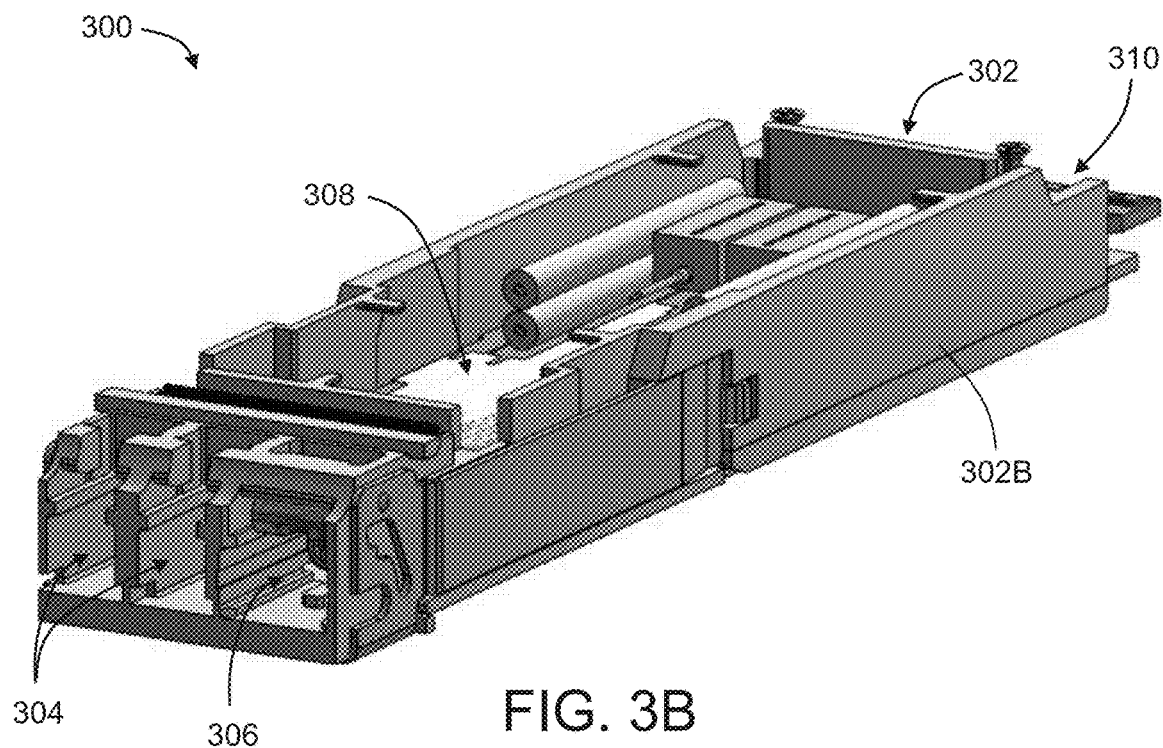
Figure 3C:
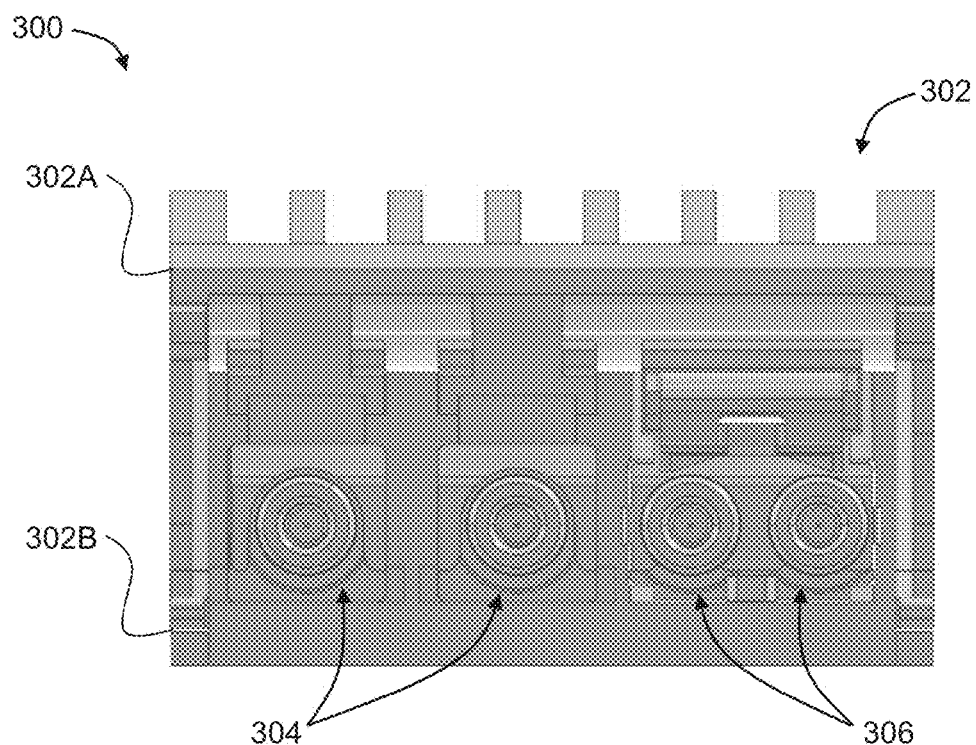

FIGS. 3A-3C include two perspective views and an end view of an example pluggable bidirectional optical amplifier module 300 (hereinafter "pluggable amplifier 300") that may be implemented in the operating environment 100 of FIG. 1, arranged in accordance with at least one embodiment described herein. The pluggable amplifier 300 may include or correspond to the pluggable amplifier 200 of FIG. 2.

For example, as illustrated, the pluggable amplifier 300 includes a housing 302 with line-side and local-side ports 304, 306 that may include or correspond to the housing 206 with the line-side and local-side ports 208, 210 of FIG. 2. The pluggable amplifier 300 additionally includes a PCB 308 with edge connector 310 that may include or correspond to the PCB and edge connector discussed with respect to FIG. 2.

The housing 302 includes a top shell 302A (omitted from FIG. 3B) and a bottom shell 302B that cooperate to at least partially enclose one or more components inside the housing 302, such as the PCB 308, preamp and booster optical amplifiers, and other components. The line-side port 304 may include a duplex port configured to receive a duplex LC connector while the local-side port 306 may include a duplex port configured to receive a duplex CS connector.

Figure 4:
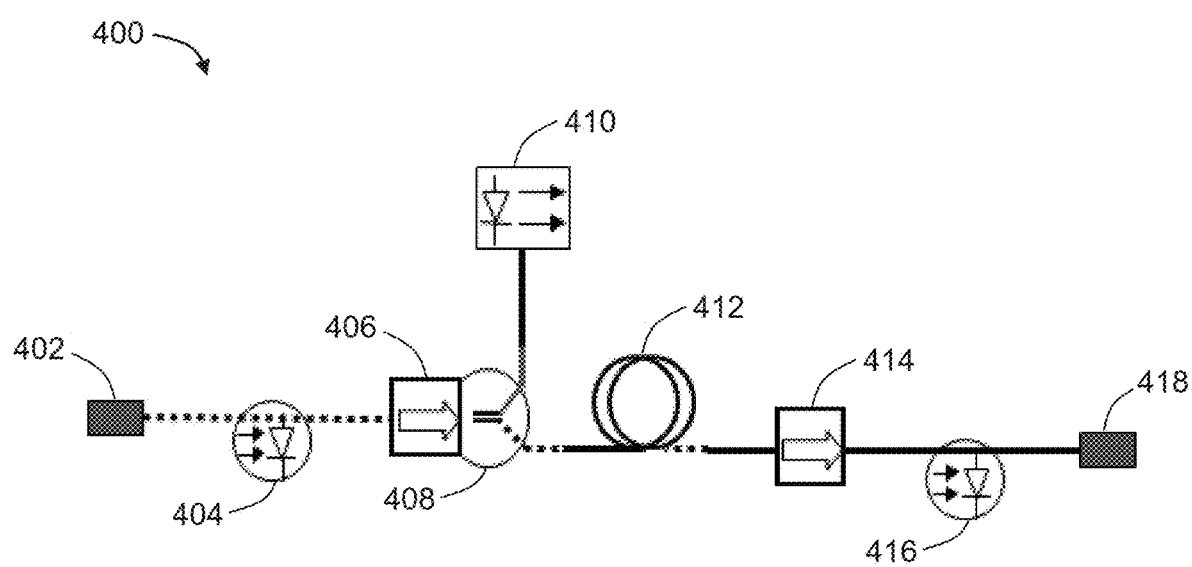
FIG. 4 illustrates an example optical amplifier that may be implemented in the pluggable bidirectional optical amplifier module of FIGS. 2-3C.

FIG. 4 illustrates an example optical amplifier 400 that may be implemented in the pluggable amplifier 200, 300 of FIGS. 2-3C, arranged in accordance with at least one embodiment described herein. The optical amplifier 400 may include or correspond to the preamp 202 or the booster 204 of FIG. 2 or other preamp or booster optical amplifiers described herein.

The optical amplifier 400 may include an input 402, an input optical splitter and photodiode 404, an input optical isolator 406 (hereinafter "input isolator 406"), an optical combiner 408, a pump laser 410, a doped-fiber amplifier 412, an output optical isolator 414 (hereinafter "output isolator 414"), an output optical splitter and photodiode 416, and an output 418. The optical amplifier 400 may be configured to operate in the C-band, the L-band, or both the C-band and the L-band.

An input optical splitter of the input optical splitter and photodiode 404 may receive an optical signal (e.g., an input signal) from the input 402 of the EDFA 107. The input optical splitter may split and provide the input signal to an input photodiode of the input optical splitter and photodiode 404 and to the optical combiner 408 through the input isolator 406. The input optical splitter may equally or unequally divide the optical power level of the input signal between optical paths to, respectively, the input photodiode and the optical combiner 408 such that the input photodiode and the optical combiner 408 may receive the input signal at divided optical power levels.

Figure 10:
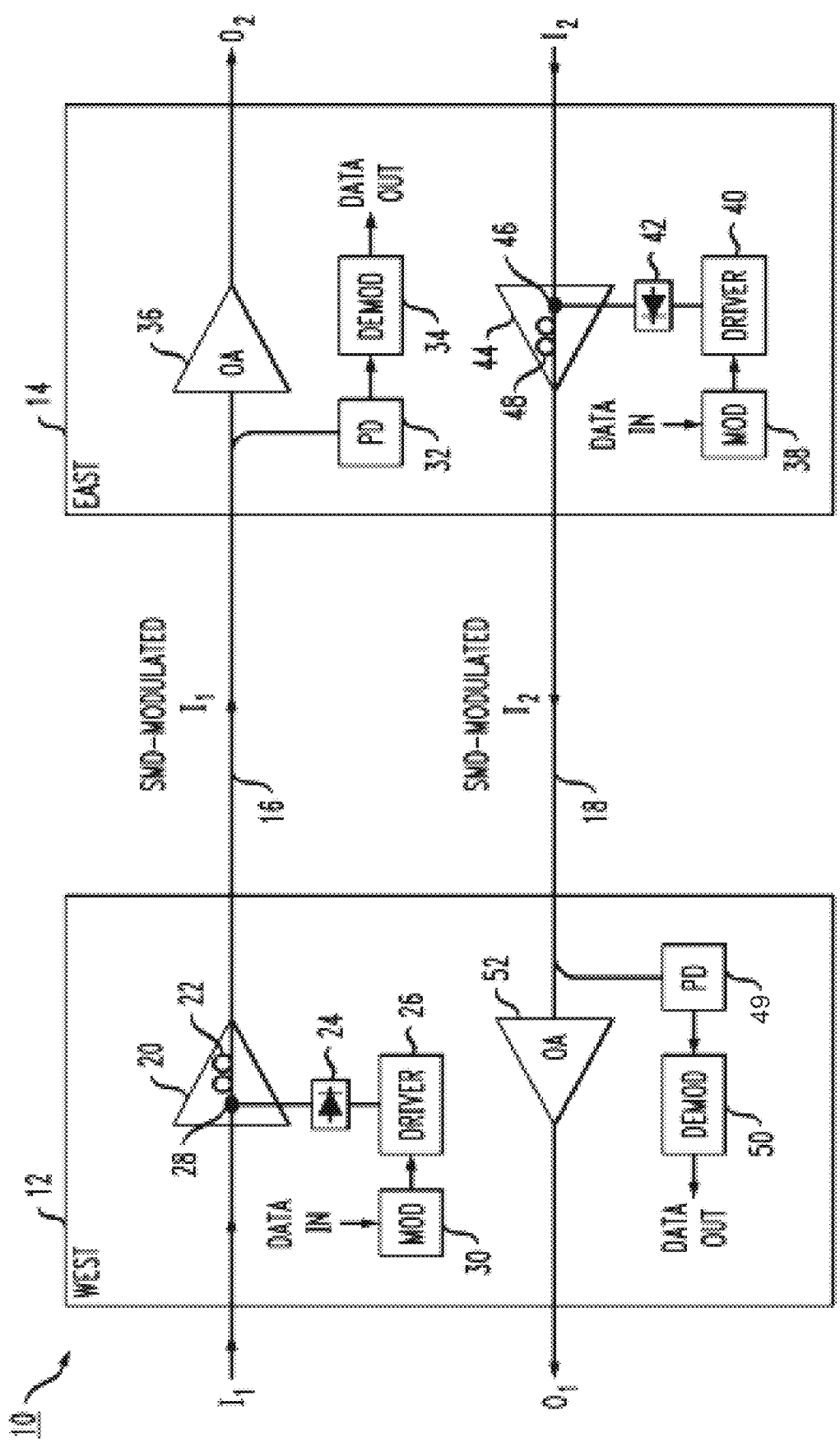
FIG. 10 is a block diagram of a pair of optical amplifier nodes configured to use pump modulation for bi-directional supervisory communication in accordance with the principles of the present invention.

The input photodiode of the input optical splitter and photodiode 404 may generate an electrical signal from which supervisory message data included in an envelope of the optical signal may be demodulated, as described in more detail with respect to, e.g., FIG. 10. Input power of the optical signal may alternatively or additionally be determined from the electrical signal generated by the input photodiode. The determined input power may be used in a gain control algorithm of the optical amplifier 400 generally in both feedforward and for input level for feedback. Alternatively or additionally, the determined input power may be used as an input in determining and setting gain of the optical amplifier 400 when coupled with information received in the supervisory message data with regard to launch power from an opposite end of a fiber span coupled to the input 402. When used for feed forward control of the pump laser 410, the electrical signal generated by the input photodiode may be referred to as an electrical feed forward control signal. An electrical drive signal applied to the pump laser 410 may be at least partially determined based on the feed forward control signal. The drive signal of the pump laser 410 may alternatively or additionally be determined based on an electrical feedback control signal generated by an output photodiode of the output optical splitter and photodiode 416. The drive signal may determine an optical gain of the optical amplifier 400.

The pump laser 410 may receive the drive signal from a pump driver (not shown in FIG. 4) and may generate a laser signal based on the drive signal. In some embodiments, the pump laser 410 may generate the laser signal as an optical signal representative of the drive signal. In these and other embodiments, the optical power level of the laser signal may be based on a current level of the drive signal.

The optical combiner 408 may receive, through the input isolator 406, the input signal at the divided optical power level from the input optical splitter of the input optical splitter and photodiode 404. In addition, the optical combiner 408 may receive the laser signal from the pump laser 410. The optical combiner 408 may combine the input signal and the laser signal into a combined signal provided to the doped-fiber amplifier 412. In some embodiments, the optical power level of the combined signal may be equal to a sum of the optical power levels of the input signal and the laser signal received by the first optical combiner 408. In other embodiments, the optical power level of the combined signal may be greater than the optical power level of the input signal or the laser signal individually but less than the sum of these optical power levels.

The doped-fiber amplifier 412 may receive the combined signal from the optical combiner 408. The doped-fiber amplifier 412 may generate an output signal as an optical signal based on the combined signal. In some embodiments, the doped-fiber amplifier 412 may be configured to apply a gain to the combined signal such that the output signal is generated as an amplified version of the combined signal. In these and other embodiments, the combined signal may drive the doped-fiber amplifier 412.

An output optical splitter of the output optical splitter and photodiode 416 may receive the output signal from the doped-fiber amplifier 412, e.g., via the output isolator 414, and split it in two. In particular, the output optical splitter may divide the optical power level of the output signal between the output 418 and the output photodiode of the output optical splitter and photodiode 416. In these and other embodiments, the output optical splitter may equally or unequally divide the optical power level of the output signal.

The output photodiode of the output optical splitter and photodiode 416 may generate an electrical feedback control signal to implement feedback control of the pump laser 410 based upon which the drive signal applied to the pump laser 410 may be at least partially determined. As previously discussed, the drive signal of the pump laser 410 may be determined based on both the feed forward control signal and the feedback control signal.

With combined reference to FIGS. 2 and 4, each of the preamp 202 and the booster 204 may include the same or similar or other configuration as the optical amplifier of 400 of FIG. 4. In some embodiments, the preamp 202 and the booster 204, whether implemented as two instances of the optical amplifier 400 or in some other configuration, may accommodate variable span loss from 0 to 20 decibels (dB)

and may support the data associated with eight channels, e.g., communication modules at each end of the span. As described in more detail below, the eight channels may be limited to a relatively narrow operational wavelength (or channel) range within the C-band or L-band and the operational wavelength range may have a relatively flat gain spectrum.

Typical multi-channel optical amplifiers are designed to work for a full band, such as the full C-band or full L-band. To support a full band and a high optical gain, a gain flattening filter (GFF) is typically required to reduce the wavelength (or channel)-dependent gain variation fundamental to the doped-fiber amplifier within each of the preamp and the booster. To keep gain ripple low over a variable gain, a variable optical attenuator (VOA) is typically needed. The GFF, VOA, or other components may be placed before, between or after one or more gain coils of each doped-fiber amplifier. Placing these components before the gain coil may increase a noise figure (NF) and decrease OSNR. Placing these components between the gain coils may require that there be at least 2 gain coils (and all the associated components). Placing these components after the gain coils may require higher pump power to reach the same output power. Inclusion of these components in an amplifier module increases costs of the amplifier module and may exceed available space of a desired package. For example, it may be difficult or impossible to fit all of the foregoing components in a pluggable bidirectional optical amplifier module that has a mechanical form factor that is compliant with the OSFP MSA.

Accordingly, in some embodiments, each of the optical amplifiers 400 implemented herein, such as the preamp 202 and the booster 204, may have an operational wavelength range that is a subset of the C-Band or the L-Band and that has a relatively flat gain spectrum. The flat gain spectrum has reduced tilt or ripple within the operational wavelength range compared to non-flat gain spectra. Ripple of the gain spectrum within the operational wavelength range may be defined as a difference at a given target gain between a maximum wavelength-dependent gain within the operational wavelength range and a minimum wavelength-dependent gain within the operational wavelength range. The flat gain spectrum may have reduced rippled such that no GFF is needed. In comparison, tilt of the gain spectrum within the operational wavelength range may be defined as a difference at a given target gain between a maximum wavelength-dependent gain within the operational wavelength range and a minimum wavelength-dependent gain within the operational wavelength range of a linear fit to the gain spectrum.

The flat gain spectrum may be obtained by operating the doped-fiber amplifier 412 at an appropriate inversion. In some embodiments, the appropriate inversion is an inversion that is higher than that usually applied to a doped-fiber amplifier when not trying to impart a flat gain spectrum to the doped-fiber amplifier. The inversion of the doped-fiber amplifier 412 may depend on the optical power level of the combined signal received from the optical combiner 408. Accordingly, the inversion of the doped-fiber amplifier 412 may be controlled by the drive signal applied to the pump laser 410.

In some embodiments, the flat gain spectrum may have reduced temperature-dependent gain within the operational wavelength range compared to non-flat gain spectra.

Because the tilt is reduced within the operational wavelength range compared to non-flat gain spectra, the VOA may be omitted. The absence of the VOA may improve optical performance, e.g., OSNR, of the optical amplifier 400 compared to an optical amplifier with a VOA as it eliminates passive loss from the VOA and associated taps and the intended attenuation that the VOA provides to keep the gain flat. The OSNR of the optical amplifier 400 may thereby be dramatically improved at least at low gain.

In some embodiments, the booster 204 may be or operate as a fixed gain amplifier and the preamp 202 may be or operate as a variable gain amplifier. Because of the simplicity of the design of the doped-fiber amplifier with flat gain that may be implemented in each of the booster 204 and the preamp 202 according to some embodiments, there is no actual difference between the two in some embodiments such that either or both of the booster 204 and the preamp 202 may be operated as a variable gain amplifier.

In addition, boosters and preamps in different pluggable amplifiers, e.g., at opposite ends of a span, may communicate with each other and exchange network information through a VSC as described elsewhere herein. Accordingly, overall link performance may be optimized. For example, gain at each of the booster and preamp at opposite ends of the span may be set to reduce electrical power consumption, e.g., in low span loss cases. In this example, the booster may operate at a lower gain and thus lower output power. Overall ripple and gain shape of a link made up of the booster and preamp at opposite ends of the span may be independent of how the gain is distributed between them.

In some embodiments, the relatively narrow operational wavelength range of the doped-fiber amplifier 412 may coincide with a region of a gain spectrum of the doped-fiber amplifier that is relatively flat to eliminate the need for a GFF. Alternatively or additionally, the operational wavelength range may coincide with minimum effect from temperature-dependent spectral gain change to eliminate the need for a coil heater or other temperature control. Over the operational wavelength range, the tilt associated with the target gain may be small enough that for a link that includes a booster and preamp at opposite ends of a span, the ripple associated with 20 dB gain is tolerable. This may be accomplished by pre-biasing the tilt negatively at the highest gain so that the lowest gain is approximately the same in the positive direction.

Figure 5:
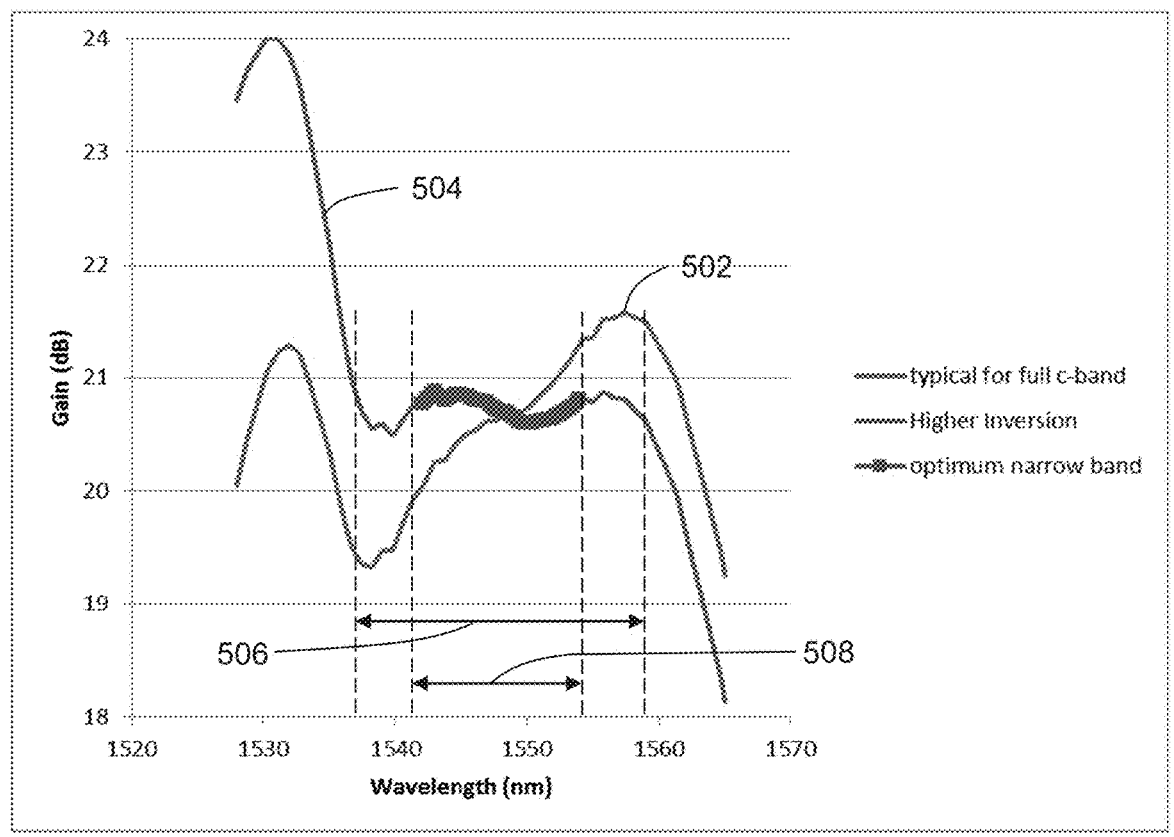
FIG. 5 graphically illustrates gain spectra of an example doped-fiber amplifier that may be included in the optical amplifier of FIG. 4.

FIG. 5 graphically illustrates gain spectra 502, 504 of an example doped-fiber amplifier that may be included in the optical amplifier of FIG. 4, arranged in accordance with at least one embodiment described herein. The doped-fiber amplifier may include or correspond to the doped-fiber amplifier 412 of FIG. 4 and may be included in the preamp 202 or the booster 204 of FIG. 2 or other optical amplifiers described herein.

The gain spectrum 502 is a typical gain spectrum of the doped-fiber amplifier when used for the full C-band, e.g., from about 1530 nanometers (nm) to about 1565 nm at a target gain of about 20 dB. The inversion of the doped-fiber amplifier may be selected to minimize a maximum deviation of the gain spectrum 502 across the entire C-band. In an example, the inversion of the doped-fiber amplifier to obtain the gain spectrum 502 is about 0.62-0.63.

The gain spectrum 504 has a much greater maximum deviation across the entire C-band than the gain spectrum 502 and may result from operating the doped-fiber amplifier at a higher inversion than for the gain spectrum 502 at the target gain of about 20 dB. As illustrated, the gain spectrum 504 is relatively flat across a wavelength range 506 from about 1537 nm to about 1559 nm. It is apparent from FIG. 5 that the gain spectrum 504 has significantly higher ripple than the gain spectrum 502 over the entire C-band but the ripple of the gain spectrum 504 is much smaller than the ripple of the gain spectrum 502 over the wavelength range 506.

The operational wavelength range of the doped-fiber amplifier may be selected from within the wavelength range 506. For example, the operational wavelength range may be selected as a wavelength range 508 from about 1542 nm to about 1554 nm within the wavelength range 506.

Tilt of the operational wavelength range may scale roughly linearly with bandwidth. As the operational wavelength range is narrowed, a wider gain range may be supported for a given gain deviation. Optimal flatness of the wavelength range 508 may be obtained by operating the doped-fiber amplifier at an inversion of about 0.72. As illustrated in FIG. 5, the gain spectrum 504 has a ripple less than 0.5 dB, and specifically a ripple of about 0.25 dB, within the wavelength range 508

Figure 6:
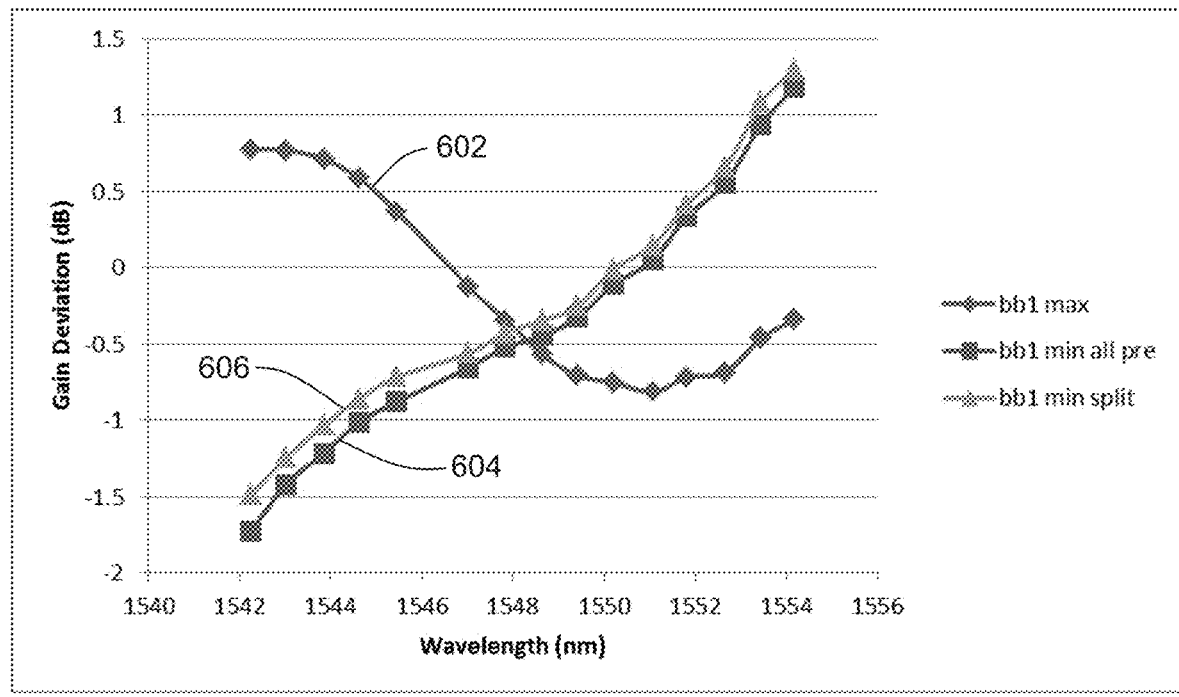
FIG. 6 graphically illustrates curves of wavelength-dependent gain deviation over a wavelength range of FIG. 5.

FIG. 6 graphically illustrates curves 602, 604, 606 of wavelength-dependent gain deviation over the wavelength range 508 of FIG. 5, arranged in accordance with at least one embodiment described herein. Data of the curves 602, 604, 606 were measured for a link that includes both a booster and a preamp, each with a doped-fiber amplifier having flat gain spectra as descried herein, at opposite ends of a span of fiber. Each of the curves 602, 604, 606 represent deviation of a sum of gain of the booster and the preamp from a total target gain.

For curve 602, total target gain was 44 dB with the booster operated at a target gain of 23 dB and the preamp operated at a target gain of 21 dB.

For curve 604, total target gain was 24 dB with the booster operated at a target gain of 23 dB and the preamp operated at a target gain of 1 dB.

For curve 606, total target gain was 24 dB with the booster operated at a target gain of 13 dB and the preamp operated at a target gain of 11 dB.

It can be seen from a comparison of curves 604 and 606 that changing the allocation of target gain between the booster and amp when the total target gain of the link as a whole is held constant has a negligible effect on the wavelength-dependent gain deviation of the link as a whole.

Figure 7:
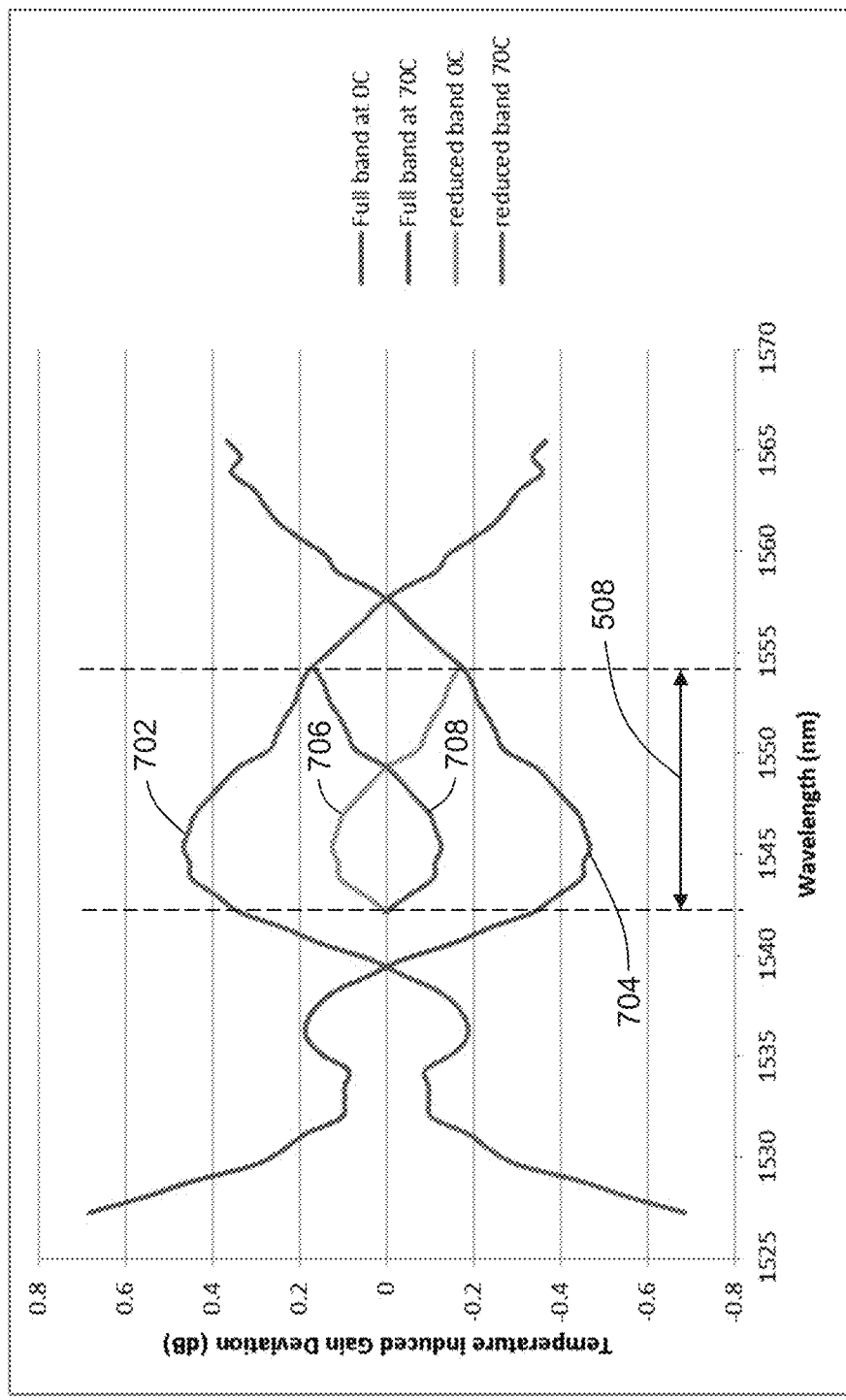
FIG. 7 graphically illustrates temperature-induced gain deviation in doped-fiber amplifiers of a link of FIG. 6.

FIG. 7 graphically illustrates temperature-induced gain deviation in the doped-fiber amplifiers of the link of FIG. 6 (e.g., booster and preamp on opposite ends of a span of fiber) for a total target gain of the link of 44 dB, arranged in accordance with at least one embodiment described herein. FIG. 7 includes curves 702, 704, 706, 708 that depict temperature-induced gain deviation for two different temperatures and two different operational wavelength ranges relative to gain at 35 C. In more detail, curve 702 represents gain deviation at 0 C compared to 35 C for the link with an operational wavelength range covering the entire C-band. Curve 702 represents gain deviation at 70 C compared to 35 C for the link with the operational range covering the entire C-band. Curve 706 represents gain deviation at 0 C compared to 35 C for the link with the operational wavelength range limited to the wavelength range 508 of FIG. 5 with the doped-fiber amplifiers operated to have a relatively flat gain within the operational wavelength range. Curve 708 represents gain deviation at 70 C compared to 35 C for the link with the operational wavelength range limited to the wavelength range 508 of FIG. 5 with the doped-fiber amplifiers operated to have a relatively flat gain within the operational wavelength range. FIG. 7 illustrates that the temperature-induced gain deviation across the narrow operational wavelength range associated with curves 706 and 708 may be significantly reduced compared to temperature-induced gain deviation across the narrow operational range of the full C-band implementations of curves 702 and 704 by operating doped-fiber amplifiers of the link to have a relatively flat gain within the operational wavelength range.

It can be seen from FIG. 7, and particularly from curves 706 and 708, that a maximum temperature-induced gain deviation within the wavelength range 508 with the doped-fiber amplifiers operated to have a relatively flat gain within the wavelength range 508 and at 0 C compared to 35 C or at 70 C compared to 35 C is less than 0.2 dB for a total gain of about 40 dB, particularly 44 dB. In comparison, it can be seen from curves 702, and 704 that when the doped-fiber amplifiers are operated to cover the full C-band, the maximum temperature-induced gain deviation within the same wavelength range 508 and at 0 C compared to 35 C or at 70 C compared to 35 C is greater than 0.4 dB for a total gain of about 40 dB, e.g., more than double the case where the doped-fiber amplifiers are operated to have a relatively flat gain within the wavelength range 508. Considering the relatively minor effect of temperature-induced gain variations when the doped-fiber amplifiers are operated to have a relatively flat gain within the wavelength range 508, some embodiments herein may include optical amplifiers that are devoid of coil heaters or other temperature control.

Because of the relatively narrow operational wavelength range associated with the flat gain, some embodiments may exhibit or include variable gain behavior without a VOA and H may use the inversion to change the gain. The total gain of a booster and preamp in a link may at least partially compensate mux/demux losses as well as span loss. The mux and demux losses may be constant in some embodiments (from link to link) such that it may be variability of the span loss that is to be compensated by variability in the gain of the booster and preamp. In an example embodiment, the preamp adjusts to compensate all the variability of the span loss. More generally, either or both of the preamp and the booster may adjust to compensate variability of the span loss.

In some embodiments, span loss may be in a range from 0 to 20 dB and the preamp may have a 20 dB gain range As gain of the preamp is lowered, the tilt may become more positive. To minimize ripple over the 20 dB gain range, some embodiments implement a negative tilt at maximum gain on both the booster and preamp of the link such that the sum from both the booster and the preamp is equal or almost equal in magnitude to the net tilt when at minimum gain.

Table 1 includes example operating parameters of a link that includes a booster, a preamp, and a span of optical fiber between the booster and the preamp, where the booster and preamp are operated to have a flat gain spectrum in the operational wavelength range from about 5142 nm to about 1554 nm. Each row in the table includes a set of parameters to compensate a particular span insertion loss (IL) specified at the beginning of the corresponding row.

TABLE 1

| Span IL (dB) | Booster Gain (dB) | Preamp Gain (dB) | Booster Tilt (dB) | Preamp Tilt (dB) | Total Tilt (dB) | Total Ripple (dB) | Booster Inversion | Preamp Inversion | Average Inversion |
|---|---|---|---|---|---|---|---|---|---|
| 20 | 23 | 20 | −1 | −1 | −2 | 2 | 0.79 | 0.79 | 0.79 |
| 15 | 23 | 15 | −1 | 0 | −1 | 1 | 0.79 | 0.707 | 0.7485 |
| 10 | 23 | 10 | −1 | 1 | 0 | 0.5 | 0.79 | 0.624 | 0.707 |
| 5 | 23 | 5 | −1 | 2 | 1 | 1.25 | 0.79 | 0.541 | 0.6655 |
| 0 | 23 | 0 | −1 | 3 | 2 | 2.5 | 0.79 | 0.458 | 0.624 |

In the example of Table 1, the booster gain is fixed and the preamp gain is set to match the span IL. The total ripple is not quite symmetric because of the details of how the gain shape changes as the inversion is changed. The average inversion is the average of the inversions of the booster and the preamp.

The design of the optical amplifier 400 of FIG. 4 itself and the operation thereof to have a flat gain spectrum across a narrow operational wavelength range is relatively simple as described herein and can be implemented in optical amplifiers operated as variable or fixed gain amplifiers. In a system that includes a booster and preamp at opposite ends of a span of fiber, both may be variable gain in some embodiments. When implemented with a VSC, the booster and preamp may communicate with each over the span to exchange operating conditions and partition the variable gain between the booster and the preamp to lower the overall electrical power consumption of the system. In the case of low span loss, the system OSNR may be substantially better than in the case of high span loss. As such, launch power from the booster may be reduced (by running it at a lower gain) to lower electrical power consumption. It is the spectral sum of the booster and the preamp combined that impacts the system according to some embodiments (see FIG. 6) and this may be independent of how the gain is partitioned between the booster and the preamp.

As already mentioned, doped-fiber amplifiers included in optical amplifiers described herein may be operated at higher inversion to obtain a relatively flat gain spectrum over a narrow operational wavelength range and avoid use of a GFF. Such an arrangement may benefit from using a relatively short erbium coil for the doped-fiber amplifier, thereby reducing cost compared to embodiments that implement a longer erbium coils.

When a relatively short erbium coil is implemented as the doped-fiber amplifier, there tends to be more residual pump power at the end of the coil. Too much residual pump power entering an optical isolator (e.g., the output isolator 414 of FIG. 4) that follows the coil (e.g., the doped-fiber amplifier 412 of FIG. 4) may be detrimental to performance. A maximum output power of the optical amplifier as well as an extent to which the gain spectrum of the optical amplifier may be negatively pre-biased may be limited to avoid excess residual pump power entering the optical isolator. In some embodiments, one or more components may be included in the optical amplifier to reduce residual pump power and thereby raise limits on the maximum output power and the extent to which the gain spectrum may be negatively pre-biased. The one or more components may include a thin film filter or other device or component positioned at an input of the output isolator or other location to reduce the residual pump power.

FIGS. 8A and 8B illustrate an example colorless multiplexer (mux)/demultiplexer (demux) cable assembly 800 (hereinafter "mux/demux cable 800"), arranged in accordance with at least one embodiment described herein. The mux/demux cable 800 may generally include a 1:N optical splitter 802 (FIG. 8B), an N:1 optical combiner 804 (FIG. 8B), and first and second fiber optical cables 806, 808. N is used herein to denote any positive integer of 2 or higher.

The first fiber optic cable 806 may include an input fiber 810 and an output fiber 812. The input fiber 810 may be optically coupled to an input of the 1:N optical splitter 802. The output fiber 812 may be optically coupled to an output of the N:1 optical combiner 804.

The second fiber optic cable 808 may include N output fibers 814 and N input fibers 816. The N output fibers 814 may be optically coupled to an output of the 1:N optical splitter 802. The N input fibers 816 may be optically coupled to an input of the N:1 optical combiner 804.

With combined reference to FIGS. 1, 2, 8A, and 8B, the mux/demux cable 800 may be configured to optically couple the pluggable amplifier 200 to N communication modules 108 and to multiplex and demultiplex optical signals from and to the N communication modules 108. In more detail, an inbound optical signal made up of N optical signals (each signal having a single channel) may be received through the input fiber 810 of the mux/demux cable 800 from the pluggable amplifier 200 via the local-side port 210 of the pluggable amplifier 200. The inbound optical signal is received at the 1:N optical splitter 802, which may divide the optical signal N ways. The resulting N divided optical signals may then be output from the mux/demux cable 800 through the N output fibers 814, each of the N divided optical signals being provided to a different one of the N communication modules 108. The N divided optical signals may have equal or unequal power depending on the desired implementation.

Analogously, N outbound optical signals may be received from the N communication modules 108 through the N input fibers 816 and provided to the N:1 optical combiner 804. The N:1 optical combiner 804 may multiplex, e.g., spatially combine, the N outbound optical signals into a single outbound optical signal. The outbound optical signal may be output to the pluggable amplifier 200 through the output fiber 812 of the mux/demux cable 800 and the local-side port 210 of the pluggable amplifier 200.

In some embodiments, the communication modules 108 may include tunable and/or coherent communication modules. Tunable communication modules have tunable lasers that can be tuned to any one of multiple wavelength channels. Coherent communication modules have a local oscillator that interferes with a received inbound optical signal for demodulation. The local oscillator is tuned to an assigned wavelength channel. If multiple distinct wavelength channels are received at a given communication module at the same time, the demodulation with the local oscillator effectively ignores all wavelength channels except the assigned wavelength channel.

Accordingly, the mux/demux cable 800 may be implemented as a colorless mux/demux that does not provide wavelength-dependent multiplexing/demultiplexing. Instead, the mux/demux cable 800 may be wavelength-agnostic. For example, rather than dividing an optical signal made up of N wavelength channels according to wavelength into N discrete optical signals each substantially including a different one of the N wavelength channels, the mux/demux cable 800 may instead divide the optical signal into N optical signals of equal or unequal power, each of the N optical signals made up of the N wavelength channels albeit of divided optical power. The N optical signals may then be provided to the N communication modules. Where the N communication modules 108 are coherent communication modules, only a particular one of the N wavelength channels that is assigned to the communication module 108 will be demodulated at the communication module 108, the other N wavelength channels being ignored.

The colorless nature of the mux/demux cable 800 may allow intrinsic wavelength agility of tunable communication modules. In comparison, filter-based/colored mux/demux modules may handicap tunability of some communication modules.

The colorless mux/demux cable 800 described herein may introduce higher loss compared to colored mux/demux modules. The total loss may nevertheless be acceptably low and/or may be at least partially compensated for by increasing optical gain of the pluggable amplifier.

In an example embodiment, N is 8. In other embodiments, N may be higher or lower than 8 provided there is adequate OSNR margin.

The mux/demux cable 800 may be insensitive to modulation format and rate. Alternatively or additionally, the mux/demux cable 800 may support virtually any wavelength channel width and spacing combinations.

As illustrated in FIGS. 8A and 8B, the mux/demux cable 800 may further include one or more fiber optic connectors coupled to distal ends of the first and second fiber optic cables 806, 808 or to distal ends of the optical fibers 810, 812, 814, 816. For example, one or more first fiber optic connectors 818 (FIG. 8A) may be coupled to a distal end of the first fiber optic cable 806 or to distal ends of the input and output fibers 810, 812. As another example, one or more second fiber optic connectors 820 (FIG. 8A) may be coupled to a distal end of the second fiber optic cable 808 or to distal ends of the N output and input fibers 814, 816.

The first and second fiber optic connectors 818, 820 may include any suitable fiber optic connectors that are complementary to corresponding ports of a pluggable amplifier or communication module into which the first and second fiber optic connectors 818, 820 may be inserted.

For example, the one or more first fiber optic connectors 818 may be configured to be inserted into the local-side port 306 of the pluggable amplifier 300 where the local-side port 306 is configured to receive a single duplex CS fiber optic connector. In this example, the one or more first fiber optic connectors 818 may include a single duplex CS fiber optic connector coupled to distal ends of each of the input fiber 810 and the output fiber 812. In other embodiments, the one or more fiber optic connectors 818 may include two CS fiber optic connectors rather than a single duplex CS fiber optic connector, or other duplex or non-duplex fiber optic connectors.

As another example, the one or more second fiber optic connectors 820 may be configured to be inserted into line in and line out ports of a communication module and the line in and line out ports of each communication module may be collectively configured to receive a single duplex LC fiber optic connector. In this example, the one or more second fiber optic connectors 820 may include N duplex LC fiber optic connectors coupled to distal ends of the N input and N output fibers 814, 816, each of the N duplex LC fiber optic connectors configured to be received in the line in and line out port of a communication module. In this example, distal ends of the N output and N input fibers 814, 816 may be are arranged in N pairs. Each of the N pairs may include a distal end of one of the N output fibers 814 and a distal end of one of the N input fibers 816. Each of the N second duplex fiber optic connectors may be coupled to a corresponding one of the N pairs. In other embodiments, the one or more fiber optic connectors 820 may include two LC fiber optic connectors rather than a single duplex LC fiber optic connector, or other duplex or non-duplex fiber optic connectors.

In some embodiments, the one or more first fiber optic connectors 818 may have a different form factor than the one or more second fiber optic connectors 818, referred to herein as an asymmetric connector configuration. The asymmetric connector configuration of the mux/demux cable 800 may prevent or reduce cable connection errors.

Some embodiments may apply very low depth pump modulation to implement a VSC amplifier node-to-amplifier node two-way communication as now described with respect to FIGS. 9-14.

Figure 9:
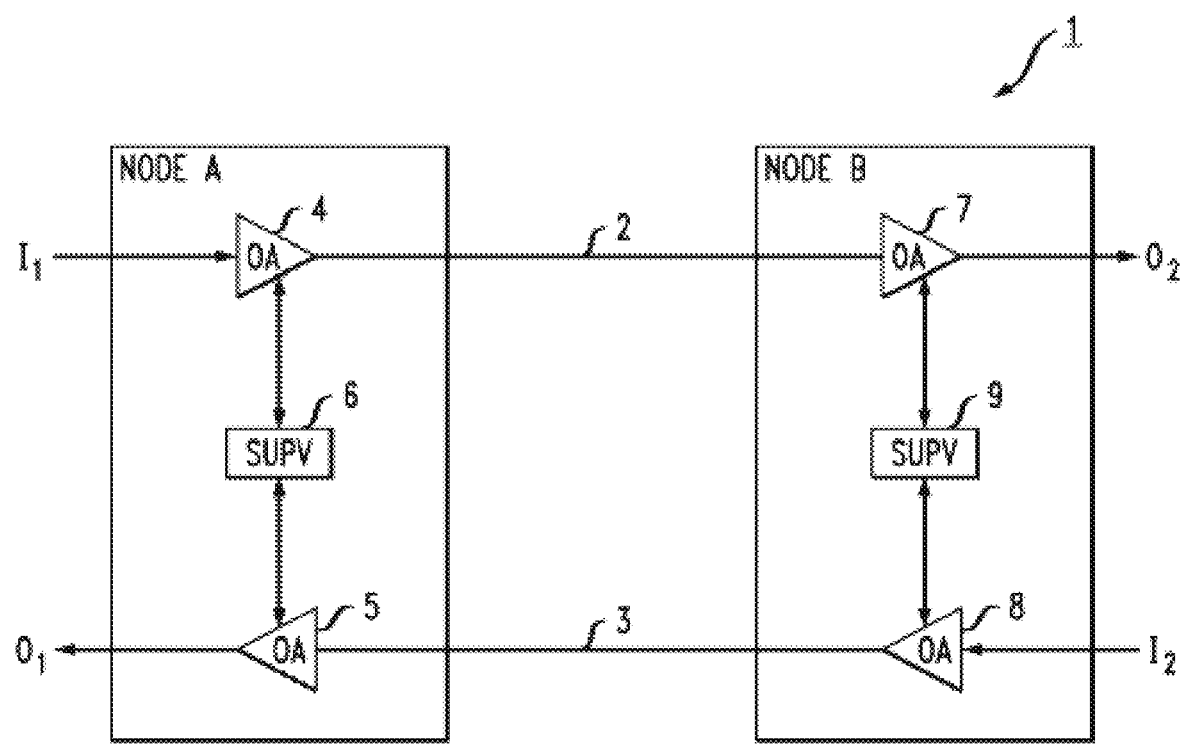
FIG. 9 illustrates an exemplary prior art use of an optical supervisory channel to provide link-to-link monitoring between amplifiers in an optical communication system.

FIG. 9 shows an illustrative prior art configuration of a pair of optical nodes A, B as typically found in an optical communication network 1, with a pair of optical fibers 2, 3 used to provide bidirectional communication between node A and node B. In this example, optical communication network 1 is configured to provide west-to-east communications via optical fiber 2 and east-to-west communications via optical fiber 3.

Node A includes a first optical amplifier 4 to receive information-bearing optical signals $I_1$ (hereinafter referred to as "customer signals"), amplify the customer signals, and couple these amplified signals into optical fiber 2 for the west-to-east propagation to node B. Node A also includes a second optical amplifier 5 to receive and amplify customer signals that arrive from Node B in the east-to-west direction along optical fiber 3 and supply these amplified signals as output signals $O_1$. Node A also includes a supervisory unit 6 to provide supervisory and telemetry functions associated with optical amplifiers. The operation of supervisory unit 6 is well known to those skilled in the art and is used to facilitate messaging across a supervisory data link established between optical components such as optical amplifiers and the like. This prior art supervisory data link takes the form of a separate channel from the information-bearing customer signals, and as a result requires components (and component space), at an additional cost, within each amplifier node.

Similarly, Node B includes optical amplifiers 7 and 8 to receive, amplify, and supply optical signals in the respective directions along optical fiber paths 2 and 3, respectively. More specifically, node B receives information-bearing optical signals $I_2$ (i.e., customer signals), amplifies these customer signals within optical amplifier 8, and supplies the amplified signals along optical fiber path 3 in the east-to-west direction to node A. Optical amplifier 7 receives and amplifies optical signals that arrive from node A on optical fiber 2 and supplies the amplified signals as output signals $O_2$. Node B also includes a supervisory unit 9 to carry out similar functions as those described for the corresponding element in node A.

The supervisory signal is typically used for messaging, alarm reporting, and so on between nodes A and B. For example, the optical amplifier 4 in node A may receive a counter-propagating supervisory signal, filter it out of the information-bearing customer signals, and provide it to the supervisory unit 5 to facilitate control of node A (in conjunction with a controller, not shown). The same principles of operation apply for communication in the optical fiber path 3 involving the respective components of nodes A and B.

As shown in FIG. 9, conventional systems require processing of the supervisory signal at each optical amplifier location. Because of the extra components required in the optical amplifiers and the potentially large number of optical amplifiers in a transmission system, the cost of the individual amplifiers is typically a cost driver for the overall system.

FIG. 10 is a high level diagram of a portion of an optical communication network 10, in particular illustrating a pair of optical amplifier nodes 12, 14 formed in accordance with the present invention to utilize pump modulation for bidirectional signaling of supervisory message data (as well as, perhaps, other non-customer network management commands and messages) between the amplifier nodes. The amplifier nodes 12, 14 of FIG. 10 may be implemented in pluggable form and may therefore include or correspond to, e.g., the pluggable amplifiers 200, 300 of FIGS. 2-3C and may be referred to individually as the first node 12 or the second node 14.

In FIG. 10, a first optical fiber 16 is used to support the "west-to-east" transmission of optical signals from the first node 12 to the second node 14, and a second optical fiber 18 is used to support the "east-to-west" transmission of optical signals from the second node 14 to the first node 12. The term "bidirectional" as applied to supervisory messages as described herein refers to the establishment of signal paths for supervisory messages to travel in each direction between a given pair of amplifier nodes. These bidirectional supervisory messages may propagate along (unidirectional) optical fibers 16 and 18; the combination of optical fibers 16 and 18 thus forming the bidirectional link for the transmission of supervisory messages between a pair of adjacent amplifier nodes.

As with the conventional operation of an amplifier node as discussed above, customer signals $I_1$ that enter the first node 12 are passed through an optical amplifier 20 to boost the power in these signals before being coupled into the optical fiber 16 and transmitted along to the second node 14. The optical amplifier 20 may include or correspond to the booster optical amplifiers described elsewhere herein and is shown in this embodiment to take the form of a doped-fiber amplifier, including a section of rare-earth doped gain fiber 22. Also shown in this view is a pump source 24 (e.g., a laser diode that operates at a known pump wavelength, such as 980 nm for Er-doped fiber) and a pump driver 26 used to provide an input drive signal to the pump source 24 and energize the pump source 24. An optical combiner 28 is included in the optical amplifier 20 to combine this pump light with the incoming customer optical signals, providing their combination as the input to the gain fiber 22, where the presence of the pump light results in amplification (increasing the power level) of the customer signals.

In accordance with some embodiments, a modulator 30 is included within the first node 12 and is used to modulate the drive current provided by the pump driver 26. The modulation is based on the supervisory message data (shown as "DATA IN") that is to be transmitted from the first node 12 to the second node 14. In particular, the modulator 30 receives the supervisory information data or other network information as an input and utilizes this data to modulate the pump drive signal. As a result, the amplification experienced by the customer signals is varied as a function of this modulation, which may take the form of an envelope superimposed on the amplified customer signals, as described in more detail elsewhere herein.

The modulated, amplified customer signal thereafter propagates along the optical fiber 16 and is received by the second node 14, as in the conventional node-to-node transmission process. In accordance with some embodiments, however, a portion of the received signal is tapped out and converted into an electrical equivalent E by an included photodiode 32. The electrical signal E is subsequently applied as an input to a demodulator 34, which may be configured to match the functioning of modulator 30, to recover the actual supervisory message data or other network information transmitted from the first node 12 to the second node 14.

The majority of the received customer signal is passed through a first optical amplifier 36 included within the second node 14 to boost the power of the customer signal prior to exiting the second node 14 as output signal $O_2$.

To provide a complete bidirectional communication path, the second node 14 includes a modulator 38 that is responsive to its own "local" supervisory message data or other network information that is to be transmitted back to the first node 12. As with the configuration discussed above, the modulator 38 uses this supervisory message data or other network information as "DATA IN" to modulate a pump driver 40 that is used to energize an included pump source 42. Here, both an incoming set of customer signals $I_2$ and the modulated pump light are applied as inputs to a fiber-based amplifier 44. In particular, the customer signals $I_2$ and the pump light are combined within an optical combiner 46 and introduced into a gain fiber 48. Thus, the data values of the supervisory message data or other network information is used to modulate the amplification of the customer signals, exhibited as superimposed on a power envelope of the customer signals, which is thereafter coupled into the optical fiber 18 for transmission to the first node 12.

A photodetector 49 and associated demodulator 50 are included in the first node 12 to respond to an out-coupled portion of this incoming signal on the optical fiber 18 and recover the particular supervisory message information or other network information being transmitted from the second node 14 to the first node 12. As shown in FIG. 2, a majority of the incoming customer signal $I_2$ is directed into an optical amplifier 52 to be boosted before exiting as output customer signal $O_1$.

Figure 11:
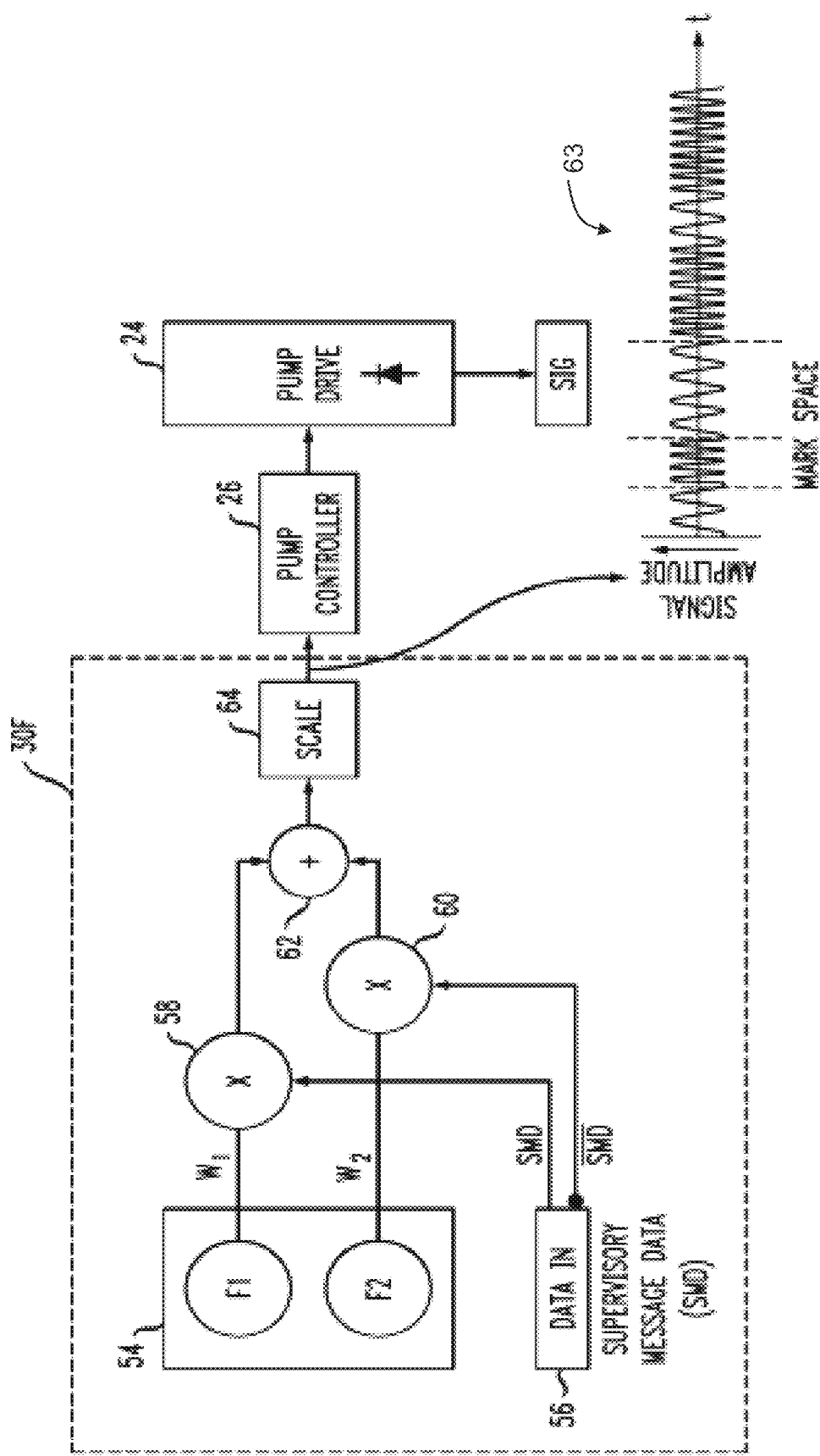
FIG. 11 shows an exemplary configuration of a modulator arrangement that may be used to control a pump source, superimposing supervisory message data onto customer signals in accordance with the present invention.

FIG. 11 illustrates an example configuration of a modulator that may be used to impress supervisory message data or other network information on the pump signal used to amplify customer signals in the manner described above. In particular, FIG. 11 illustrates an example frequency-shift keying (FSK) modulator 30F that may be suited for this application to superimpose a sinusoidal modulation on the envelope of the customer signals passing through the amplifier. The FSK modulator 30F may include or correspond to the modulator 30, 38 of FIG. 10. The magnitude of the modulation power impressed on the customer signals may be controlled to ensure that the power envelope of the (modulated) amplified customer signals does not exceed a threshold that would otherwise introduce bit errors in the customer data. For example, a modulation depth of 0.5 dB has been found satisfactory in accurately transmitting supervisory message data or other network information while maintaining the integrity of the customer signals used to support the transmission of this supervisory information or other network information.

The modulator 30F may include a binary FSK modulator that utilizes a pair of sinusoidal-based waveforms W1 and W2, stored in an on-chip memory element 54. The memory element 54 as illustrated provides as separate outputs the first sinusoidal waveform W1 (which operates at a fixed frequency $f_1$) and the second sinusoidal waveform W2 (operating at a different fixed frequency $f_2$). The incoming supervisory message data (hereinafter defined as "SMD") or other network information is digital in form and is used to switch between the transmission of waveform W1 and waveform W2 as a function of the logic value to be transmitted.

A particular configuration of a suitable switching arrangement is shown in FIG. 3 as including a data interface 56, which provides a pair of outputs in the form of the original supervisory stream SMD and a complement stream SMD. The original stream SMD is thereafter applied as a first input to a first multiplier 58, where a second input is the first sinusoidal waveform W1. In a similar manner, the complement stream SMD is thereafter applied as a first input to a second multiplier 60, with the second sinusoidal waveform W2 applied as a second input. Thus, in accordance with the principles of binary FSK modulation, an incoming SMD signal that has a logic value "1" will be modulated by the first frequency $f_1$, and data of a logic "0" value will be modulated by the second frequency $f_2$. The two modulated streams are then combined within an adder 62 to provide the carrier modulation output of the modulator 30F that is applied as an input to the pump driver 26 to control the power of the pump light that enters the amplifier 20. Said another way, the "raw" SMD incoming digital stream is used to switch between the two frequencies $f_1$ and $f_2$ applied as the input to the pump driver 26. An example form of an output from the modulator 30F applied as an input to the pump driver 26 is shown in FIG. 11 at 63.

In some embodiments, the FSK modulator 30F may also include a scaling element, shown as scaling element 64 in FIG. 11. The scaling element 64 may be used to control the magnitude of the modulated signal so that the envelope of the modulated customer signal does not exceed a given threshold. A modulation depth of 0.5 dB has been found to be acceptable.

Figure 12:
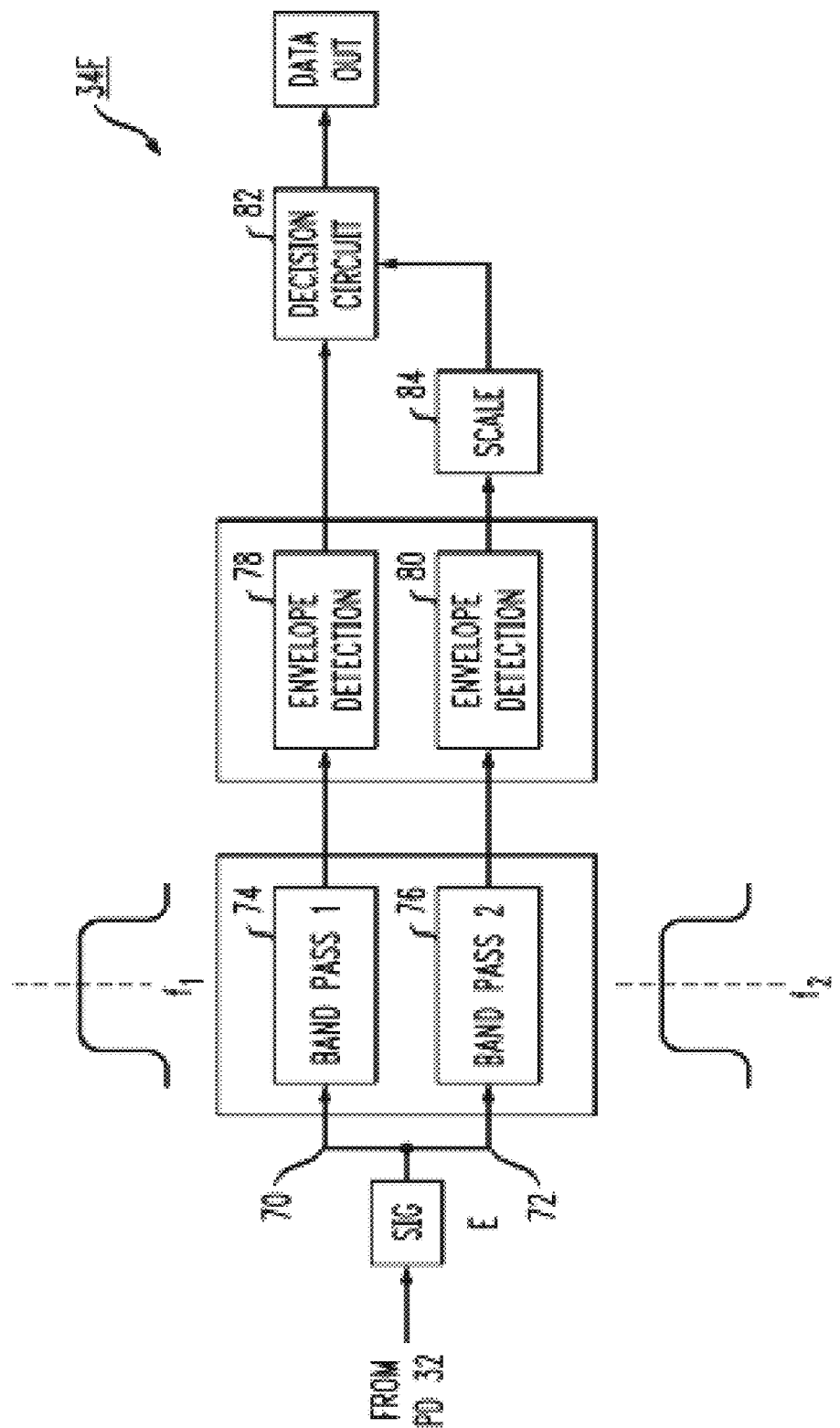
FIG. 12 shows an exemplary configuration of a demodulator arrangement for use in combination with the modulator arrangement of FIG. 11 to recover supervisory message data that has been sent from a first optical amplifier node to a second optical amplifier node.

An example demodulator 34F configured for use with the FSK modulator 30F is shown in FIG. 12. The FSK demodulator 34F may include or correspond to the demodulator 34, 50 of FIG. 10. In this arrangement, a nonsynchronous FSK demodulator 34F is used to process the converted electrical version of the modulated, amplified customer signal received at an amplifier node. That is, with reference to FIG. 10, a portion of the incoming modulated customer signal received at the second node 14 is first converted into an electrical signal version E by included photodiode 32, with electrical signal E thereafter applied as the input to the FSK demodulator 34F.

As illustrated in FIG. 12, the FSK-modulated electrical signal E may use bandpass filtering typical in FSK modulation to determine the proper frequency (i.e., $f_1$ or $f_2$) used for the specific received data bit. That is, input E is applied along parallel paths shown in FIG. 12 as paths 70 and 72. Path 70 includes a first bandpass filter 74, centered at the frequency $f_1$, and path 72 includes a second bandpass filter 76, centered at the frequency $f_2$. The passband (i.e., bandwidth) of the filters 74, 76 is typically relatively narrow and may be set empirically (i.e., a higher filter Q will provide a sharper passband, at the expense of a longer lag in tracking the signal, while a lower filter Q will increase the responsivity of the demodulator, at the expense of perhaps introducing errors in the recovered supervisory message data or other network information). The outputs from the bandpass filters 74, 76 will discern if there is a tone (if that frequency is associated with the current signal value), or remain at a zero output level. A separate envelope detector may be disposed at the output of each bandpass filter 74, 76, shown as a first envelope detector 78 disposed at the output of first bandpass filter 74 and a second envelope detector 80 disposed at the output of second bandpass filter 76. The responses from detectors 78, 80 are thereafter applied as separate inputs to a decision circuit 82, which thereafter provides a reconstructed version of the original digital supervisory information or other network information. In preferred embodiments, a scaling element 84 is disposed along one of the signal paths (here, shown as along path 72) and is used to equalize the peak values produced by the pair of envelope detectors 78, 80.

One advantage of pump modulation message signaling is the ability to use this type of messaging to enable self-provisioning for a new amplifier node installation. That is, using messaging between a pair of nodes and the local measurements, the amplifiers may be configured to perform set-up in terms of pump power levels. Since no customer traffic is yet passing through these nodes, the amplified spontaneous emission (ASE) generated by activation of the pump laser diodes and the response of the optical amplifier components may be used as the "signal" upon which the provisioning message data is superimposed. Considered as "noise", the ASE is still a signal in a form where the supervisory messaging data or other network information may be used to modulate to the pump driver to superimpose the data on the envelope of the ASE itself. No additional hardware is required beyond what is already available at a typical amplifier node. Thus, the pump modulation scheme described herein may be used to transmit supervisory messages or other network information between amplifier nodes, perform dynamic link set-up, and perhaps also transmit higher-level message protocols, allowing this information to be sent from one amplifier node to another in one direction from a given network access point to another access point.

In some embodiments, certain messages transmitted between a pair of amplifier nodes do not need to continue to propagate along a signal path to other downstream amplifier nodes (or other network elements), the self-provisioning discussed above being one example of this type of "local" messaging. In these and other embodiments, it may be preferable to utilize active filtering of a modulated, amplified (received) customer signal to remove the SMD modulating envelope prior to reintroducing the propagating customer signal into the network signal path. Without some means for removing the superimposed SMD, it may otherwise remain as an artifact on the customer signal as it propagates through the network. Indeed, this remaining modulation may subsequently be impacted by a "new" supervisory message that a particular amplifier node desires to transmit downstream to the next node in the sequence. Without any type of filtering, these supervisory messages or other network information may continue to build up along a signal path within the optical communication network.

Figure 13:
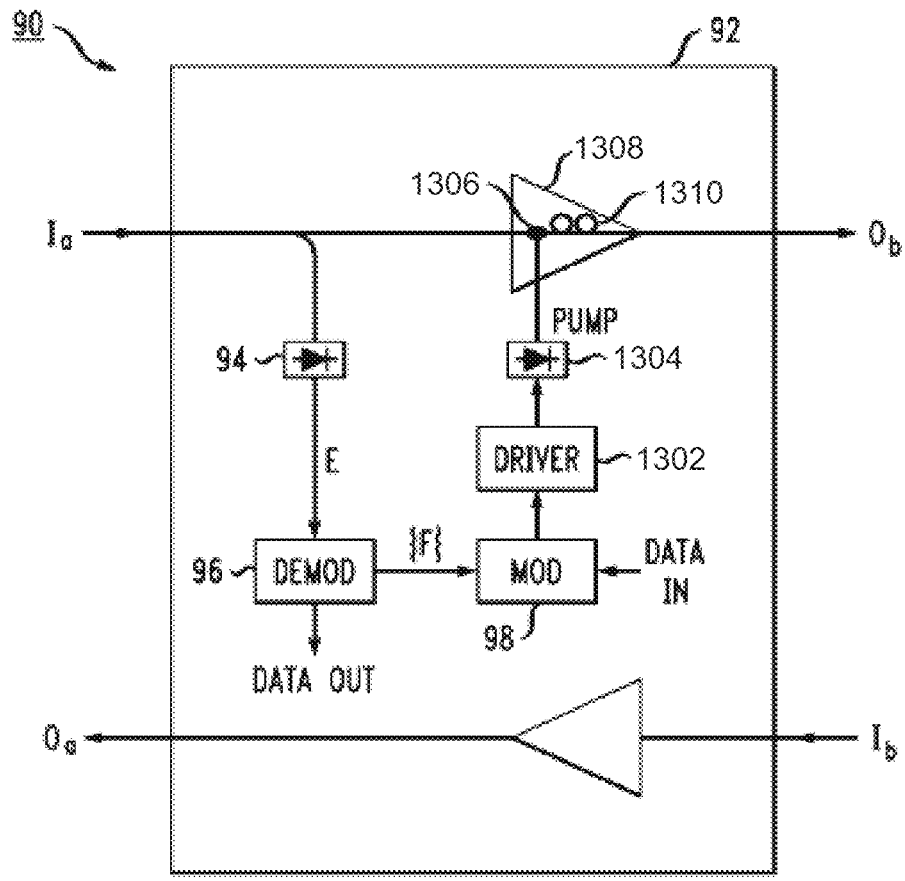
FIG. 13 illustrates an exemplary configuration utilizing active filtering in combination with a demodulator arrangement.

FIG. 13 illustrates a portion of an optical communication network 90 that uses active filtering to minimize the continual propagation of SMD that is contemplated as only needing to be transmitted between a defined pair of nodes.

In particular, FIG. 13 illustrates a portion of an example optical amplifier node 92, which is considered to be a "receive" node, similar to the second node 14 described above, where the optical input received by the node 92 is a customer signal $I_a$ that includes SMD superimposed on its envelope in the manner described above. Similar to the configuration described above, a portion of this message-modulated input customer signal $I_a$ is out-coupled and applied as an input to a photodetector 94 to create an electrical version E of the received signal, with the electrical version E then demodulated within an included demodulator 96 to recover the transmitted supervisory message or other network information ("DATA OUT").

In accordance with this embodiment, the information related to the recovered SMD may be used in an active filtering mode to eliminate the presence of this modulating envelope on the actual customer signal that is passing through node 92. In the embodiment shown in FIG. 13, this recovered data stream is provided as an input to an included modulator 98. The modulator 98 may, for example, use the inverse of the recovered data to provide a modulation signal that will essentially cancel out the SMD signal riding on the envelope of the propagating customer signal. The output from the modulator 98 may be used as an input to a pump driver circuit 1302, which then provides a modulating control signal to an included pump laser diode 1304 in the same manner as discussed above.

The modulating pump output may then be combined with the received customer signal $I_a$ in an optical combiner 1306 within a fiber-based optical amplifying component 1308, with the combination of signal and modulated pump thereafter passed through a section of rare earth-doped gain fiber 1310 to provide a "clean" output customer signal Ob ("clean" in this case meaning that the residual SMD has essentially been removed).

In arrangements where it is desired to inject a "new" supervisory message or other network information for transmission to a following node, the "DATA IN" may be applied to the modulator 98, which then processes both this new data and the need to remove the old data in a manner such that modulating envelope superimposed on output customer signal Ob represents only the new information.

Figure 14:
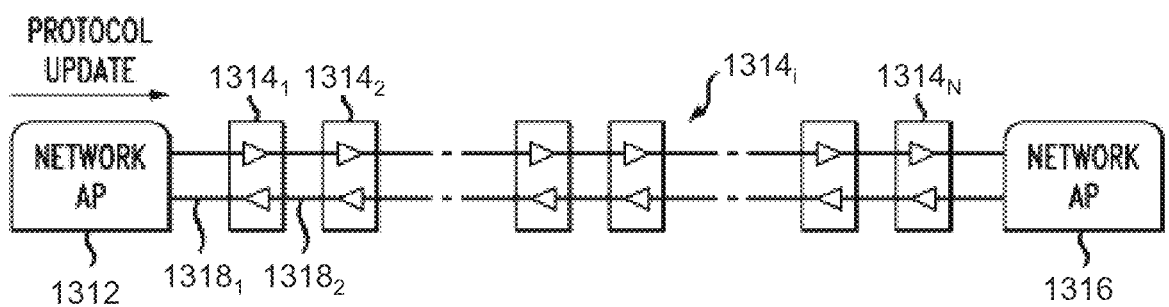
FIG. 14 contains a simplified diagram of a portion of an optical communication network that utilizes pump modulation in accordance with the teachings of the present invention to transmit high-level protocol information from a first network access point to a second network access point through one or more optical amplifier nodes.

FIG. 14 illustrates yet another embodiment, in this case where it is desirous to continue to transmit the same "supervisory" message or other network information along a set of concatenated amplifier nodes disposed along a link between a pair of network access points. Thus, in contrast to the configuration shown in FIG. 13 where the received/recovered supervisory data or other network information is intentionally removed from the propagating customer signal, in this case the same superimposed modulation is maintained as the customer signal propagates through the network.

In particular, FIG. 14 illustrates an arrangement where it is presumed that a first network access point 1312 needs to update certain protocol information at multiple amplifier nodes $1314_1, 1314_2, \ldots, 1314_N$ disposed between the first network access point 1312 and a second network access point 1316. In accordance with some embodiments, the protocol information is superimposed on the customer signal exiting the first network access point 1312, and thereafter propagates along links $1318_1, 1318_2$, to the second network access point 1316. Each intervening amplifier node $1314_i$ may recover this protocol update and adjust its operations accordingly, as will the second network access point 1316. In this example, no "active filtering" is used to remove the protocol information from the propagating customer signal.

Unless specific arrangements described herein are mutually exclusive with one another, the various implementations described herein can be combined in whole or in part to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pluggable bidirectional optical amplifier module, comprising:
   a preamp optical amplifier to amplify optical signals traveling in a first direction;
   a booster optical amplifier to amplify optical signals traveling in a second direction; and
   a housing that at least partially encloses the preamp optical amplifier and the booster optical amplifier,
   wherein the pluggable bidirectional optical amplifier module has a mechanical form factor that is compliant with a pluggable communication module form factor multisource agreement (MSA),
   wherein each of the preamp and booster optical amplifiers comprises a doped-fiber amplifier that has a flat gain spectrum across an operational wavelength range; and
   where the doped-fiber amplifier of the preamp optical amplifier has the flat gain spectrum across the operational wavelength range when operated at an inversion of at least 0.7 and a target gain of at least 15 decibels (dB).

2. The pluggable bidirectional optical amplifier module of claim 1, wherein the pluggable communication module form factor MSA comprises the OSFP MSA.

3. The pluggable bidirectional optical amplifier module of claim 1, further comprising:
a first duplex port configured to receive a first duplex fiber optic connector; and
a second duplex port configured to receive a second duplex fiber optic connector having a different form factor than the first duplex fiber optic connector.

4. The pluggable bidirectional optical amplifier module of claim 1, wherein the operational wavelength range comprises the wavelength range from 1542 nanometers to 1554 nanometers.

5. The pluggable bidirectional optical amplifier module of claim 1, wherein a ripple of the gain spectrum, defined as a difference at a given target gain between a maximum wavelength-dependent gain within the operational wavelength range and a minimum wavelength-dependent gain within the operational wavelength range, of the doped-fiber amplifier of one of the preamp optical amplifier or the booster optical amplifier is 0.5 decibels (dB) or less.

6. The pluggable bidirectional optical amplifier module of claim 1, wherein the pluggable bidirectional optical amplifier module is devoid of a variable optical attenuator and wherein at least one of the preamp optical amplifier or the booster optical amplifier is operable as a variable gain amplifier.

7. The pluggable bidirectional optical amplifier module of claim 6, wherein:
the preamp optical amplifier is operable as a variable gain amplifier and is optically coupled through a fiber span to a remote booster optical amplifier of a remote pluggable bidirectional optical amplifier;
the preamp optical amplifier, the fiber span, and the remote booster optical amplifier form a link;
the remote booster optical amplifier is operable as a variable gain amplifier;
the pluggable bidirectional optical amplifier and the remote pluggable bidirectional optical amplifier module are configured to determine and adjust a target preamp gain of the preamp optical amplifier and a target remote booster gain of the remote booster optical amplifier to reduce power consumption of one or both of the preamp optical amplifier or the remote booster optical amplifier compared to at least one other allocation of the target preamp gain and the target remote booster gain to the preamp optical amplifier and the remote booster optical amplifier; and
a sum of the target preamp gain and the target remote booster gain is equal to a total target link gain of the link.

8. The pluggable bidirectional optical amplifier of claim 1, wherein the pluggable bidirectional optical amplifier module is devoid of a coil heater and wherein a maximum temperature-induced gain deviation within the operational wavelength range at 0° C. compared to 35° C. or at 70° C. compared to 35° C. is no greater than 0.2 decibels (dB) for a total gain of 40 dB.

9. The pluggable bidirectional optical amplifier module of claim 1, wherein the pluggable bidirectional optical amplifier module is configured to exchange network information with another pluggable bidirectional optical amplifier module through a virtual supervisory channel (VSC).

10. The pluggable bidirectional optical amplifier module of claim 1, wherein at least one of the preamp optical amplifier or the booster optical amplifier comprises:
a fiber-based optical amplifier;
a pump source operatively coupled to the fiber-based optical amplifier and configured to output a pump signal effective to impart gain onto an optical signal that passes through the fiber-based amplifier to generate an amplified optical signal;
a pump driver operatively coupled to the pump source and configured to output an electrical drive signal to drive the pump source; and
a modulator operatively coupled to the pump driver and configured to output a modulation signal to the pump driver to modulate the electrical drive signal,
wherein the modulation signal appears as an envelope on the amplified optical signal.

11. The pluggable bidirectional optical amplifier module of claim 1, wherein at least one of the preamp optical amplifier or the booster optical amplifier comprises:
a fiber-based optical amplifier that receives an optical signal that has network information superimposed thereon;
a demodulator operatively coupled to the fiber-based optical amplifier and configured to receive as an input an electrical version of the optical signal and to recover from the electrical version of the optical signal the network information superimposed on the optical signal.

12. The pluggable bidirectional optical amplifier module of claim 1, further comprising a host interface at least partially enclosed within the housing, the host interface configured to communicatively couple the pluggable bidirectional optical amplifier module to a host device.

13. The pluggable bidirectional optical amplifier module of claim 12, wherein the host interface comprises a paged module interface.

14. The pluggable bidirectional optical amplifier module of claim 12, wherein the host device comprises a switch or router and the host interface comprises a register table directly accessible from the switch or router.

15. A pluggable bidirectional optical amplifier module, comprising:
a preamp optical amplifier to amplify optical signals traveling in a first direction;
a booster optical amplifier to amplify optical signals traveling in a second direction; and
a housing that at least partially encloses the preamp optical amplifier and the booster optical amplifier,
wherein the pluggable bidirectional optical amplifier module has a mechanical form factor that is compliant with a pluggable communication module form factor multisource agreement (MSA),
wherein each of the preamp and booster optical amplifiers comprises a doped-fiber amplifier that has a flat gain spectrum across an operational wavelength range,
wherein a ripple of the gain spectrum, defined as a difference at a given target gain between a maximum wavelength-dependent gain within the operational wavelength range and a minimum wavelength-dependent gain within the operational wavelength range, of the doped-fiber amplifier of one of the preamp optical amplifier or the booster optical amplifier is 0.5 decibels (dB) or less.

16. The pluggable bidirectional optical amplifier module of claim 15, wherein:
- the preamp optical amplifier is operable as a variable gain amplifier and is optically coupled through a fiber span to a remote booster optical amplifier of a remote pluggable bidirectional optical amplifier;
- the preamp optical amplifier, the fiber span, and the remote booster optical amplifier form a link;
- the remote booster optical amplifier is operable as a variable gain amplifier;
- the pluggable bidirectional optical amplifier and the remote pluggable bidirectional optical amplifier module are configured to determine and adjust a target preamp gain of the preamp optical amplifier and a target remote booster gain of the remote booster optical amplifier to reduce power consumption of one or both of the preamp optical amplifier or the remote booster optical amplifier compared to at least one other allocation of the target preamp gain and the target remote booster gain to the preamp optical amplifier and the remote booster optical amplifier; and
- a sum of the target preamp gain and the target remote booster gain is equal to a total target link gain of the link.

17. The pluggable bidirectional optical amplifier of claim 15, wherein the pluggable bidirectional optical amplifier module is devoid of a coil heater and wherein a maximum temperature-induced gain deviation within the operational wavelength range at 0° C. compared to 35° C. or at 70° C. compared to 35° C. is no greater than 0.2 decibels (dB) for a total gain of 40 dB.

18. A pluggable bidirectional optical amplifier module, comprising:
- a preamp optical amplifier to amplify optical signals traveling in a first direction;
- a booster optical amplifier to amplify optical signals traveling in a second direction; and
- a housing that at least partially encloses the preamp optical amplifier and the booster optical amplifier,
- wherein the pluggable bidirectional optical amplifier module has a mechanical form factor that is compliant with a pluggable communication module form factor multisource agreement (MSA),
- wherein each of the preamp and booster optical amplifiers comprises a doped-fiber amplifier that has a flat gain spectrum across an operational wavelength range; and
- wherein the pluggable bidirectional optical amplifier module is devoid of a coil heater and wherein a maximum temperature-induced gain deviation within the operational wavelength range at 0° C. compared to 35° C. or at 70° C. compared to 35° C. is no greater than 0.2 decibels (dB) for a total gain of 40 dB.

19. The pluggable bidirectional optical amplifier module of claim 18, wherein:
- the preamp optical amplifier is operable as a variable gain amplifier and is optically coupled through a fiber span to a remote booster optical amplifier of a remote pluggable bidirectional optical amplifier;
- the preamp optical amplifier, the fiber span, and the remote booster optical amplifier form a link;
- the remote booster optical amplifier is operable as a variable gain amplifier;
- the pluggable bidirectional optical amplifier and the remote pluggable bidirectional optical amplifier module are configured to determine and adjust a target preamp gain of the preamp optical amplifier and a target remote booster gain of the remote booster optical amplifier to reduce power consumption of one or both of the preamp optical amplifier or the remote booster optical amplifier compared to at least one other allocation of the target preamp gain and the target remote booster gain to the preamp optical amplifier and the remote booster optical amplifier; and
- a sum of the target preamp gain and the target remote booster gain is equal to a total target link gain of the link.

* * * * *